US012795632B2

(12) United States Patent
Yuan et al.

(10) Patent No.: US 12,795,632 B2
(45) Date of Patent: Nov. 10, 2026

(54) BEAM CONFIGURATION METHOD, APPARATUS, AND COMMUNICATION SYSTEM

(71) Applicant: HUAWEI TECHNOLOGIES CO., LTD., Shenzhen (CN)

(72) Inventors: Shitong Yuan, Chengdu (CN); Bo Fan, Chengdu (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 304 days.

(21) Appl. No.: 18/404,052

(22) Filed: Jan. 4, 2024

(65) Prior Publication Data

US 2024/0147452 A1 May 2, 2024

Related U.S. Application Data

(63) Continuation of application No. PCT/CN2022/104456, filed on Jul. 7, 2022.

(30) Foreign Application Priority Data

Jul. 15, 2021 (CN) ........................ 202110802671.X

(51) Int. Cl.
*H04W 4/00* (2018.01)
*H04W 72/044* (2023.01)

(52) U.S. Cl.
CPC ................................. *H04W 72/046* (2013.01)

(58) Field of Classification Search
CPC ............. H04W 72/044; H04W 72/046; H04W 72/042; H04W 36/32; H04W 52/0206; H04W 72/04; H04W 76/27; H04B 7/06
USPC .......................................................... 370/329
See application file for complete search history.

(56) References Cited

U.S. PATENT DOCUMENTS

| | | | | |
|---|---|---|---|---|
| 10,568,136 | B2 * | 2/2020 | Chou | H04W 16/14 |
| 10,893,516 | B2 * | 1/2021 | Nam | H04W 72/1273 |
| 11,212,825 | B2 * | 12/2021 | Gong | H04W 72/1273 |
| 12,212,395 | B2 * | 1/2025 | Hakola | H04B 7/06952 |
| 2018/0343636 | A1 * | 11/2018 | Goldstein | H04W 64/00 |
| 2018/0343646 | A1 * | 11/2018 | Chou | H04W 16/14 |
| 2019/0141693 | A1 * | 5/2019 | Guo | H04L 5/0053 |
| 2019/0274125 | A1 * | 9/2019 | Nam | H04L 5/0098 |

(Continued)

FOREIGN PATENT DOCUMENTS

| | | | | |
|---|---|---|---|---|
| EP | 3606195 A1 | | 2/2020 | |
| EP | 4346261 A1 | * | 4/2024 | H04W 16/28 |
| WO | WO-2019096129 A1 | * | 5/2019 | H04B 7/06 |

*Primary Examiner* — Marceau Milord
(74) *Attorney, Agent, or Firm* — Maier & Maier, PLLC

(57) ABSTRACT

A beam configuration method, an apparatus, and a communication system. The method includes: a terminal device receives a beam configuration message, where the beam configuration message indicates a new beam. The terminal device may determine, at a time at which first duration starting from a first moment is reached, to use the new beam for communication. The first moment is a moment at which the terminal device switches to the new beam. In this case, the terminal device and the network node on which the old beam is located, and/or the terminal device and the network node on which the new beam is located can have consistent understandings on an effective time of the new beam, to achieve accurate communication.

20 Claims, 5 Drawing Sheets

(56) References Cited

U.S. PATENT DOCUMENTS

| | | | | |
|---|---|---|---|---|
| 2020/0021350 | A1* | 1/2020 | Koskela | H04W 16/28 |
| 2020/0154467 | A1* | 5/2020 | Gong | H04L 5/0055 |
| 2020/0177242 | A1* | 6/2020 | Kim | H04L 5/0051 |
| 2021/0051736 | A1* | 2/2021 | Jeon | H04W 76/11 |
| 2022/0046612 | A1* | 2/2022 | Ma | H04W 72/0453 |

* cited by examiner

BEAM CONFIGURATION METHOD, APPARATUS, AND COMMUNICATION SYSTEM

CROSS-REFERENCE TO RELATED APPLICATIONS

This application is a continuation of International Application No. PCT/CN2022/104456, filed on Jul. 7, 2022, which claims priority to Chinese Patent Application No. 202110802671.X, filed on Jul. 15, 2021. The disclosures of the aforementioned applications are hereby incorporated by reference in their entireties.

TECHNICAL FIELD

The embodiments relate to the field of wireless communication technologies and to a beam configuration method, an apparatus, and a communication system.

BACKGROUND

When a terminal device performs layer 1/layer 2-based beam switching, no solution is provided in conventional technologies to determine an effective time of a new beam. The terminal device and a cell in which an old beam is located, and the terminal device and a cell in which the new beam is located may have inconsistent understandings on the effective time of the beam. As a result, accurate communication cannot be achieved.

SUMMARY

The embodiments include a beam configuration method, an apparatus, and a communication system, so that a terminal device and a network node on which an old beam is located, and/or the terminal device and a network node on which a new beam is located can have consistent understandings on an effective time of the new beam, thereby achieving accurate communication.

According to a first aspect, a beam configuration method is provided, including the following processes: a terminal device receives a beam configuration message sent by a first network node, where the beam configuration message indicates a first beam, and the first beam is a beam used by the terminal device to receive and/or send a signal. The terminal device determines, at a time at which first duration starting from a first moment is reached, to use the first beam to receive and/or send a signal.

In this method, the terminal device may perform beam switching based on the beam configuration message, to switch to a beam (which is a new beam to which the terminal device switches, for example, the first beam) different from a current beam (which is an old beam used before the terminal device implements switching). A network node on which the old beam is located may be different from or the same as a network node on which the new beam is located.

The first moment may be a moment at which the terminal device switches to the first beam, or the first moment may be a moment at which the terminal device is handed over to a second network node on which the first beam is located, or the first moment may be a moment at which the terminal device sends, after switching to the first beam, a first acknowledgement message to the second network node on which the first beam is located, or the first moment may be a moment at which the terminal device sends a second acknowledgement message for the beam configuration message to the first network node, or the first moment may be a moment at which the terminal device receives the beam configuration message.

The first duration may be determined based on at least one piece of the following first information: duration required for switching a frequency band by the terminal device, duration required for switching a bandwidth part BWP by the terminal device, duration required for activating the first beam by the terminal device, duration required for switching a component carrier CC by the terminal device, and a capability reported by the terminal device.

In this method, at the time at which the first duration starting from the first moment is reached, it may be determined that the new beam takes effect. The terminal device and the first network node on which the old beam is located, and/or the terminal device and the second network node on which the new beam is located may determine a same first moment and same first duration, to determine a same effective time of the new beam, thereby achieving accurate communication.

In a possible implementation, when the first moment is the moment at which the terminal device switches to the first beam, before determining to use the first beam to receive and/or send a signal, the terminal device may further send a random access request to the second network node on which the first beam is located, and receive a random access response message sent by the second network node. In this implementation, after receiving the beam configuration message, the terminal device may perform random access, and after random access is completed, the terminal device determines to switch to the first beam or be handed over to the second network node on which the first beam is located. The terminal device may use the moment at which the terminal device switches to the first beam or is handed over to the second network node on which the first beam is located as the first moment. Correspondingly, the second network node may also use the moment at which the terminal device switches to the first beam or is handed over to the second network node as the first moment. Therefore, the terminal device and the second network node can have consistent understandings on the effective time of the new beam.

In a possible implementation, when the first moment is the moment at which the terminal device sends the second acknowledgement message for the beam configuration message to the first network node, before determining to use the first beam to receive and/or send a signal, the terminal device may further send a random access request to the second network node on which the first beam is located, receive a random access response message sent by the second network node, and send the second acknowledgement message for the beam configuration message to the first network node. In this implementation, after random access is completed, the terminal device may use the moment at which the terminal device sends the second acknowledgement message as the first moment. Correspondingly, the first network node may use a moment at which the first network node receives the second acknowledgement message as the first moment. Therefore, the terminal device and the first network node can have consistent understandings on the effective time of the new beam.

In a possible implementation, when the first moment is the moment at which the terminal device sends, after switching to the first beam, the first acknowledgement message to the second network node on which the first beam is located, before determining to use the first beam to receive and/or send a signal, the terminal device sends a random access request to the second network node, and receives a random access response message sent by the second network node, and the terminal device sends the first acknowledgement message for the random access response message to the second network node. In this implementation, after random access is completed, the terminal device may use the moment at which the terminal device sends the first acknowledgement message as the first moment. Correspondingly, the second network node may use a moment at which the second network node receives the first acknowledgement message as the first moment. Therefore, the terminal device and the second network node can have consistent understandings on the effective time of the new beam.

In a possible implementation, when the first moment is the moment at which the terminal device switches to the first beam, or the first moment is the moment at which the terminal device sends the second acknowledgement message for the beam configuration message to the first network node, before determining to use the first beam to receive and/or send a signal, the terminal device may further send the second acknowledgement message for the beam configuration message to the first network node, send a random access request to the second network node on which the first beam is located, and receive a random access response message sent by the second network node. In this implementation, the terminal device may use the moment at which the terminal device switches to the first beam or is handed over to the second network node on which the first beam is located as the first moment. Correspondingly, the second network node may also use the moment at which the terminal device switches to the first beam or is handed over to the second network node as the first moment. The terminal device and the second network node have consistent understandings on the effective time of the new beam. Alternatively, the terminal device may use the moment at which the terminal device sends the second acknowledgement message as the first moment. Correspondingly, the first network node may use a moment at which the second acknowledgement message is received as the first moment. The terminal device and the first network node have consistent understandings on the effective time of the new beam.

In a possible implementation, when the first moment is the moment at which the terminal device sends, after switching to the first beam, the first acknowledgement message to the second network node on which the first beam is located, before determining to use the first beam to receive and/or send a signal, the terminal device may further send the second acknowledgement message for the beam configuration message to the first network node, send a random access request to the second network node, receive a random access response message sent by the second network node, and send the first acknowledgement message for the random access response message to the second network node. In this implementation, after random access is completed, the terminal device may use the moment at which the terminal device sends the first acknowledgement message as the first moment. Correspondingly, the second network node may use a moment at which the second network node receives the first acknowledgement message as the first moment. Therefore, the terminal device and the second network node can have consistent understandings on the effective time of the new beam.

In a possible implementation, the random access response message includes indication information of a second beam. When sending the first acknowledgement message for the random access response message to the second network node, the terminal device may send the first acknowledgement message for the random access response message to the second network node by using the second beam.

The second beam may be the same as or different from the first beam. For example, a width of the second beam is smaller than a width of the first beam. The second network node indicates a narrower second beam to the terminal device, to implement more efficient communication.

In a possible implementation, when the first moment is the moment at which the terminal device sends the second acknowledgement message for the beam configuration message to the first network node, before determining to use the first beam to receive and/or send a signal, the terminal device may further send the second acknowledgement message for the beam configuration message to the first network node. In a switching scenario in which random access is not required, the terminal device may use the moment at which the terminal device sends the second acknowledgement message as the first moment. Correspondingly, the first network node may use a moment at which the first network node receives the second acknowledgement message as the first moment. Therefore, the terminal device and the first network node can have consistent understandings on the effective time of the new beam.

In a possible implementation, when the first moment is the moment at which the terminal device receives the beam configuration message, before determining to use the first beam to receive and/or send a signal, the terminal device determines that the moment at which the beam configuration message is received is the first moment. Correspondingly, the first network node may use a moment at which the beam configuration message is sent as the first moment. Therefore, the terminal device and the first network node can have consistent understandings on the effective time of the new beam.

Optionally, the first network node and the second network node may communicate with each other, so that the terminal device, the first network node, and the second network node can have consistent understandings on the effective time of the new beam.

In a possible implementation, the first duration may include T2, and T2 is related to the at least one piece of first information.

For example, T2 satisfies the following formula: $T2=TO_k\times(T_{first}+T_{proc})+T_{22}$, where $TO_k$ is 0 or 1, $T_{first}$ is related to the moment at which the terminal device receives the beam configuration message and a moment at which the terminal device receives a first signal sent by the second network node, $T_{proc}$ is related to duration for processing the first signal by the terminal device, and $T_{22}$ is related to the at least one piece of first information.

In a possible implementation, the first duration is further related to the moment at which the terminal device receives the beam configuration message and/or the moment at which the terminal device sends the second acknowledgement message.

For example, the first duration satisfies the following formula: T=T1+T2, where T is the first duration, T1 is related to the moment at which the terminal device receives the beam configuration message and the moment at which the terminal device sends the second acknowledgement message, and T2 is related to the at least one piece of first information.

According to a second aspect, a beam configuration method is provided. The method includes: a second network node receives a random access request sent by a terminal device, where the random access request is sent after the terminal device receives beam configuration information sent by a first network node, the beam configuration message indicates a first beam, and the first beam is a beam used by the terminal device to receive and/or send a signal. The second network node sends a random access response message to the terminal device, where the random access response message includes indication information of a second beam. The second network node receives, based on the second beam, a first acknowledgement message that is for the random access response message and that is sent by the terminal device.

The second beam may be the same as or different from the first beam. For example, a width of the second beam is smaller than a width of the first beam. The second network node indicates a narrower second beam to the terminal device, to implement more efficient communication.

According to a third aspect, a communication apparatus is provided. The communication apparatus may be the foregoing terminal device or network node, or may be a chip disposed in the terminal device or the network node. The communication apparatus may implement the method according to the first aspect or the second aspect.

The communication apparatus includes a corresponding module, unit, or manner for implementing the foregoing method. The module, unit, or means may be implemented by using hardware or software, or implemented by using hardware by executing corresponding software. The hardware or the software includes one or more modules or units corresponding to the foregoing functions.

According to a fourth aspect, a communication apparatus is provided, including a transceiver unit. Optionally, the communication apparatus may further include a processing unit. The communication apparatus may implement the method according to the first aspect or the second aspect.

According to a fifth aspect, a communication apparatus is provided, including a processor. The processor may be configured to perform the method according to the first aspect or the second aspect.

Optionally, the apparatus further includes a memory. The processor is coupled to the memory, and may be configured to execute instructions in the memory, to enable the apparatus to perform the method according to the first aspect or the second aspect.

Optionally, the apparatus further includes an interface circuit, and the processor is coupled to the interface circuit.

The interface circuit may be a code/data read/write interface circuit. The interface circuit is configured to receive computer-executable instructions (the computer-executable instructions are stored in the memory, and may be directly read from the memory, or may be read by using another component) and transmit the computer-executable instructions to the processor, so that the processor runs the computer-executable instructions to perform the method according to any one of the foregoing aspects.

In some possible embodiments, the communication apparatus may be a chip or a chip system.

According to a sixth aspect, a communication apparatus is provided, including a processor and a memory. The processor is configured to read instructions stored in the memory, receive a signal by using a receiver, and transmit a signal by using a transmitter, to perform the method according to the first aspect or the second aspect.

Optionally, there are one or more processors, and there are one or more memories.

Optionally, the memory may be integrated with the processor, or the memory and the processor are separately disposed.

In an implementation process, the memory may be a non-transitory (non-transitory) memory, for example, a read-only memory (ROM). The memory and the processor may be integrated on a same chip, or may be disposed on different chips. A type of the memory and a manner of disposing the memory and the processor are not limited.

The communication apparatus may be a chip. The processor may be implemented by using hardware, or may be implemented by using software. When the processor is implemented by using the hardware, the processor may be a logic circuit, an integrated circuit, or the like. When the processor is implemented by using the software, the processor may be a general purpose processor, and is implemented by reading software code stored in the memory. The memory may be integrated into the processor, or may be located outside the processor and exist independently.

According to a seventh aspect, a processor is provided, including an input circuit, an output circuit, and a processing circuit. The processing circuit is configured to receive a signal by using the input circuit, and transmit a signal by using the output circuit, so that the processor performs the method according to the first aspect or the second aspect.

In an implementation process, the processor may be a chip, the input circuit may be an input pin, the output circuit may be an output pin, and the processing circuit may be a transistor, a gate circuit, a flip-flop, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited.

According to an eighth aspect, a communication apparatus is provided, including a logic circuit and an input/output interface. The input/output interface is configured to communicate with a module other than the communication apparatus, and the logic circuit is configured to run a computer program or instructions to perform the method according to any one of the foregoing aspects. The communication apparatus may be the terminal device or the network node in the first aspect or the second aspect, or an apparatus including the terminal device or the network node, or an apparatus included in the terminal device or the network node, for example, a chip.

Alternatively, the input/output interface may be a code/data read/write interface circuit. The input/output interface is configured to receive a computer program or instructions (the computer program or the instructions are stored in a memory, and may be directly read from the memory, or may be read by using another component) and transmit the computer program or the instructions to the input/output interface, so that the input/output interface runs the computer program or the instructions to perform the method according to any one of the foregoing aspects.

Optionally, the communication apparatus may be a chip.

According to a ninth aspect, a computer program product is provided. The computer program product includes a computer program (which may also be referred to as code or instructions). When the computer program is run, a computer is enabled to perform the method according to the first aspect or the second aspect.

According to a tenth aspect, a non-transitory computer-readable medium is provided. The non-transitory computer-readable medium stores a computer program (which may also be referred to as code or instructions). When the computer program is run on a computer, the computer is enabled to perform the method according to the first aspect or the second aspect.

According to an eleventh aspect, a chip system is provided. The chip system includes a processor and an interface, configured to support a communication apparatus in implementing functions in the first aspect or the second aspect. In a possible implementation, the chip system further includes a memory, and the memory is configured to store information and data that are necessary for the foregoing communication apparatus. The chip system may include a chip, or may include a chip and another discrete component.

According to a twelfth aspect, a chip apparatus is provided. The chip apparatus includes an input interface and/or an output interface. The input interface may implement receiving functions in the first aspect or the second aspect, and the output interface may implement sending functions in the first aspect or the second aspect.

According to a thirteenth aspect, a functional entity is provided. The functional entity is configured to implement the methods according to the first aspect to the second aspect.

According to a fourteenth aspect, a communication system is provided, including the terminal device and the network node in the first aspect or the second aspect. The network node may include a first network node and/or a second network node.

The first network node and the second network node may belong to a same network device (for example, a base station), or may belong to different network devices.

In a possible implementation, when a beam is switched, the terminal device is handed over between network nodes. For example, the communication system includes the terminal device, the first network node, and the second network node. The first network node is a network node on which a beam used before the terminal device implements switching is located, and the second network node is a network node on which a beam used after the terminal device implements switching is located.

For example, the first network node may be configured to send beam configuration information to the terminal device. The beam configuration information indicates a first beam, and the first beam is a beam used by the terminal device to receive and/or send a signal.

The terminal device may be configured to receive the beam configuration message, and determine, at a time at which first duration starting from a first moment is reached, to use the first beam to receive and/or send a signal.

The second network node may be configured to use the first beam to receive a signal from and/or send a signal to the terminal device. In other words, the second network node may use the first beam to communicate with the terminal device.

In a possible case, the first moment is a moment at which the terminal device switches to the first beam, or a moment at which the terminal device is handed over to the second network node.

The terminal device may further determine the moment at which the terminal device switches to the first beam or the moment at which the terminal device is handed over to the second network node as the first moment.

The second network node may further determine the moment at which the terminal device switches to the first beam or the moment at which the terminal device is handed over to the second network node as the first moment. In this way, it can be ensured that the terminal device and the second network node have consistent understandings on an effective time of a new beam.

Optionally, the second network node may interact with the first network node. The second network node may send, to the first network node, the moment at which the terminal device switches to the first beam or the moment at which the terminal device is handed over to the second network node. The first network node determines the moment at which the terminal device switches to the first beam or the moment at which the terminal device is handed over to the second network node as the first moment. In this way, it can be ensured that the terminal device, the first network node, and the second network node have consistent understandings on the effective time of the new beam.

In another possible case, the first moment is a moment at which the terminal device sends a first acknowledgement message to the second network node.

The terminal device may further determine the moment at which the terminal device sends the first acknowledgement message to the second network node as the first moment.

The second network node may further determine a moment at which the first acknowledgement message is received as the first moment, or determine an obtained moment at which the terminal device sends the first acknowledgement message as the first moment. In this way, it can be ensured that the terminal device and the second network node have consistent understandings on the effective time of the new beam.

Optionally, the second network node may interact with the first network node. The second network node may send, to the first network node, the moment at which the terminal device sends the first acknowledgement message or the moment at which the second network node receives the first acknowledgement message. The first network node may determine the moment at which the terminal device sends the first acknowledgement message or the moment at which the second network node receives the first acknowledgement message as the first moment. In this way, it can be ensured that the terminal device, the first network node, and the second network node have consistent understandings on the effective time of the new beam.

In still another possible case, the first moment is a moment at which the terminal device sends a second acknowledgement message for the beam configuration message to the first network node.

The terminal device may further determine the moment at which the terminal device sends the second acknowledgement message for the beam configuration message to the first network node as the first moment.

The first network node may further determine a moment at which the second acknowledgement message is received as the first moment, or determine an obtained moment at which the terminal device sends the second acknowledgement message as the first moment. In this way, it can be ensured that the terminal device and the first network node have consistent understandings on the effective time of the new beam.

Optionally, the first network node may interact with the second network node. The first network node sends, to the second network node, the moment at which the terminal device sends the second acknowledgement message or the moment at which the first network node receives the second acknowledgement message. The second network node may determine the moment at which the terminal sends the second acknowledgement message or the moment at which the first network node receives the second acknowledgement message as the first moment. In this way, it can be ensured that the terminal device, the first network node, and the second network node have consistent understandings on the effective time of the new beam.

In still another possible case, the first moment is a moment at which the terminal device receives the beam configuration message.

The terminal device may further determine the moment at which the beam configuration message is received as the first moment.

The first network node may further determine a moment at which the beam configuration message is sent as the first moment, or determine an obtained moment at which the terminal device receives the beam configuration message as the first moment. In this way, it can be ensured that the terminal device and the first network node have consistent understandings on the effective time of the new beam.

Optionally, the first network node may interact with the second network node. The first network node may send, to the second network node, the moment at which the first network node sends the beam configuration message or the moment at which the terminal device receives the beam configuration message. The second network node may determine the moment at which the first network node sends the beam configuration message or the moment at which the terminal device receives the beam configuration message as the first moment. In this way, it can be ensured that the terminal device, the first network node, and the second network node have consistent understandings on the effective time of the new beam.

For effects brought by any implementation of the third aspect to the fourteenth aspect, refer to the effects brought by the first aspect. Details are not described herein again.

DETAILED DESCRIPTION OF EMBODIMENTS

Figure 1:
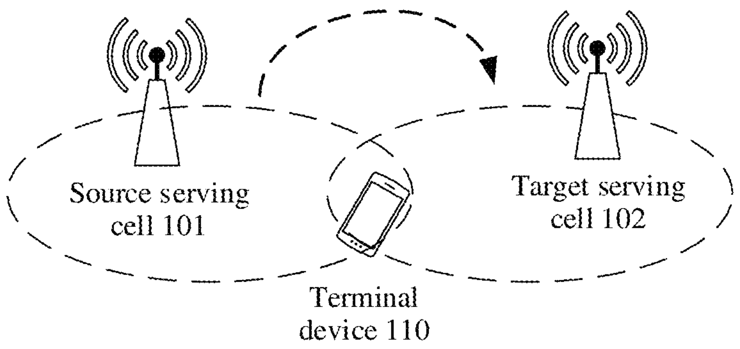
FIG. 1 is a schematic diagram of an architecture of a communication system.

The following further describes in detail the embodiments with reference to accompanying drawings.

All aspects, embodiments, or features are presented in the embodiments by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments, the word "example" is used to give an example, an illustration, or a description. Any embodiment or design described as an "example" in the embodiments shall not be explained as being more preferred or having more advantages than another embodiment or design. Exactly, the term "example" is used to present a concept in a specific manner.

A network architecture and a service scenario described in embodiments are intended to describe the solutions in embodiments more clearly, and do not constitute a limitation on the solutions provided in embodiments. A person of ordinary skill in the art may know that: with the evolution of the network architecture and the emergence of new service scenarios, the solutions provided in embodiments are also applicable to similar problems.

The following describes some terms in embodiments for ease of understanding by a person skilled in the art.

(1) Air interface protocol layers (layer) include a radio resource control (RRC) layer, a packet data convergence protocol (PDCP) layer, a radio link control (RLC) layer, a media access control (MAC) layer, a physical (PHY) layer, and the like.

In a 3rd Generation Partnership Project (3GPP) new radio (NR) standard, the PHY layer is a bottommost layer of the protocol layers, which is also referred to as layer 1 (L1), and the MAC layer is a second layer of the protocol layers, which is also referred to as layer 2 (L2).

(2) Beam: It is a communication resource. Different beams may be considered as different resources. Same information or different information may be sent by using different beams. Optionally, a plurality of beams having a same or similar communication feature may be considered as one or one group of beams. One beam may include one or more antenna ports, configured to transmit a data channel, a control channel, a sounding signal, and the like. For example, a transmit beam may be signal strength distribution formed in different spatial directions after a signal is transmitted through an antenna, and a receive beam may be signal strength distribution, in different spatial directions, of a radio signal received from an antenna. It may be understood that the one or more antenna ports forming the beam may alternatively be considered as one antenna port set.

Abeam may be a wide beam, a narrow beam, or a beam of another type. Generally, a width of the beam may be defined as a beam width of X decibels (dB). For example, the width of the beam is defined as a beam width of 1 dB, a beam width of 3 dB, or the like. The beam width of X dB includes a horizontal beam width of X dB or a vertical beam width of X dB. Generally, the wide beam and the narrow beam are related to the 3-dB beam width of the beam. The 3-dB beam width of the wide beam is larger, and the wide beam is generally used to provide wide coverage for broadcast signals. In comparison, the 3-dB beam width of the narrow beam is smaller, a coverage width of the narrow beam is smaller, and the narrow beam is generally used for point-to-point communication.

A technology for forming a beam may be a beamforming technology or another manner. The beamforming technology may be a digital beamforming technology, an analog beamforming technology, a hybrid digital/analog beamforming technology, or the like. This is not limited in embodiments.

(3) Quasi co-location (QCL): A quasi co-location relationship indicates that a plurality of resources has one or more same or similar communication features. A same or similar communication configuration may be used for the plurality of resources having the quasi co-location relationship. For example, if two antenna ports have a quasi co-location relationship, a large-scale channel characteristic in which one port transmits a symbol may be inferred from a large-scale channel characteristic in which the other port transmits a symbol. The large-scale characteristic may include delay spread, an average delay, Doppler spread, a Doppler frequency shift, an average gain, a receiving parameter, a receive beam number of a terminal device, transmitting/receiving channel correlation, an angle of arrival, spatial correlation of receiver antennas, a dominant angle of arrival (AoA), an average angle of arrival, AoA spread, and the like. "A quasi co-location indication indicates whether at least two groups of antenna ports have a quasi co-location relationship" means that the quasi co-location indication indicates whether channel state information reference signals sent by the at least two groups of antenna ports are from a same transmission point, or the quasi co-location indication indicates whether channel state information reference signals sent by the at least two groups of antenna ports are from a same beam group.

In other words, if there is a QCL relationship, a terminal device may use a receiving or sending parameter used when a reference signal is previously received, to receive or send a subsequent signal.

QCL types (Type) include QCL-TypeA, QCL-TypeB, QCL-TypeC, QCL-TypeD, and the like. QCL-TypeA, QCL-TypeB, and QCL-TypeC indicate information such as time domain and frequency domain, and assist the terminal device in data receiving, demodulation, and the like. QCL-TypeD indicates a beam, and assists the terminal device in beamforming.

(4) Reference signal (RS): According to a long term evolution (LTE)/NR protocol, at a physical layer, uplink communication includes transmission of an uplink physical channel and an uplink signal. The uplink physical channel includes a random access channel (RACH), a physical uplink control channel (PUCCH), a physical uplink shared channel (PUSCH), or the like. The uplink signal includes a sounding reference signal (SRS), a PUCCH-demodulation reference signal (DMRS), a PUSCH-DMRS, an uplink phase tracking reference signal (PTRS), an uplink positioning reference signal (uplink positioning RS), or the like. Downlink communication includes transmission of a downlink physical channel and a downlink signal. The downlink physical channel includes a physical broadcast channel (PBCH), a physical downlink control channel (PDCCH), a physical downlink shared channel (PDSCH), or the like. The downlink signal includes a primary synchronization signal (PSS)/secondary synchronization signal (SSS), a PDCCH-DMRS, a PDSCH-DMRS, a downlink PTRS, a channel state information reference signal (CSI-RS), a cell reference signal (cell reference signal, CRS) (not available in NR), a time/frequency tracking reference signal (TRS) (not available in LTE), an LTE/NR positioning reference signal (positioning RS), or the like.

(5) Transmission configuration indicator (TCI): It is a field indicating quasi co-location of PDSCH antenna ports. A TCI is configured by RRC signaling, and is referred to as a TCI-State (State) in the RRC signaling. A higher layer configures one or more QCL relationships by using the TCI-State, for example, configures QCL relationships between one or more downlink signals and a PDSCH-DMRS.

After the RRC signaling performs configuration, a network device may send a MAC control element (CE) to activate one or more TCI-States. If the TCI-State includes information about QCL-TypeD, that is, the TCI indicates one or more beams, the MAC CE may be used to activate the one or more beams, and a terminal device may measure an activated beam, that is, measure a reference signal corresponding to the activated beam.

The network device may further indicate the terminal device to use the beam indicated by the TCI to perform communication. Optionally, the beam used for communication may be one of the one or more activated beams.

(6) Random access: It is a process of establishing a wireless link between a terminal device and a network device. After random access is completed, the terminal device and the network device may exchange data.

A process of contention-based random access includes the following steps: the terminal device sends a message (Msg) 1 to the network device, where the Msg1 includes a random access preamble. The network device sends an Msg2 to the terminal device, where the Msg2 includes a temporary cell radio network temporary identifier (C-RNTI) allocated to the terminal device. The terminal device sends an Msg3 to the network device, where the Msg3 includes the temporary C-RNTI. The network device sends an Msg4 to the terminal device, where the Msg4 includes a C-RNTI allocated to the terminal device that succeeds in accessing the network device. In this case, it may be considered that the terminal device completes random access.

A process of contention-free random access includes the following steps: the terminal device sends an Msg1 to the network device, and the network device sends an Msg4 to the terminal device. An Msg2 and an Msg3 are not required in the process of contention-free random access.

The term "and/or" in the embodiments describes an association relationship of associated objects and indicates that three relationships may exist. For example, A and/or B may indicate the following three cases: only A exists, both A and B exist, and only B exists. The character "/" generally indicates an "or" relationship between the associated objects.

In the embodiments, "at least one" means one or more, and "a plurality of" means two or more.

In addition, it should be understood that in description of the embodiments, terms such as "first" and "second" are merely used for distinguishing and description purposes, but shall not be understood as indicating or implying relative importance, or shall not be understood as indicating or implying a sequence.

The solutions in embodiments may be applied to various communication systems. The communication systems may include, but are not limited to, a 4th generation (4G) communication system (for example, an LTE system), a 5th generation (5G) communication system (for example, an NR system), a future mobile communication system, and the like. The embodiments may also be applied to another communication system, for example, a satellite communication system. The satellite communication system may be integrated with the foregoing communication system.

The communication system provided in embodiments is applicable to communication between a network device and a terminal device. The communication system may include one or more network devices and one or more terminal devices. The network device may transmit data and control signaling to the terminal device. For example, as shown in FIG. 1, a communication system may include a plurality of network devices (for example, a source serving cell 101 and a target serving cell 102) and one terminal device (for example, a terminal device 110). The source serving cell 101 may send signaling to the terminal device 110 for the terminal device 110 to be handed over to the target serving cell 102. The communication system in embodiments may also be applicable to communication between network devices, communication between terminal devices, and communication between an internet of vehicles, an internet of things, an industrial internet, and the like.

Optionally, the network device in embodiments is a device that connects the terminal device to a wireless network. The network device may be a node in a radio access network, and may also be referred to as a base station or a radio access network (RAN) node (or device). For example, the network device may include an evolved NodeB (NodeB or eNB or eNodeB) in an LTE system or an LTE-Advanced (LTE-A) system, for example, a conventional macro eNB (eNB) and a micro eNB (eNB) in a heterogeneous network scenario; or may include a next generation NodeB (gNB) in a 5G NR system; or may include a transmission reception point (TRP), a home base station (HNB), a baseband unit (BBU), a baseband pool (BBU pool), a wireless fidelity (Wi-Fi) access point (AP), or the like; or may include a central unit (CU) and a distributed unit (DU) in a cloud radio access network (Cloud RAN) system; or may include a network device in a non-terrestrial network (NTN), that is, may be deployed on a high-altitude platform or a satellite. In the NTN, the network device may be used as a layer 1 (L1) relay (relay), or may be used as a base station, or may be used as a DU, or may be used as an integrated access and backhaul (IAB) node. This is not limited. Further, the network device may also be a node in a core network.

Optionally, the terminal device in embodiments may be a device configured to implement a wireless communication function, for example, a terminal or a chip that may be used in a terminal. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. Alternatively, the terminal may be a terminal (for example, an internet of vehicles device) in vehicle-to-everything (V2X), a terminal in device-to-device (D2D) communication, a terminal in machine-to-machine (M2M) communication, or the like. The terminal may be mobile or fixed.

When the terminal device performs beam switching that is based on L1/L2, no solution is provided in a conventional technology to determine an effective time of a new beam. The terminal device and a cell in which an old beam is located, and the terminal device and a cell in which the new beam is located may have inconsistent understandings on the effective time of the beam. As a result, accurate communication cannot be achieved.

Based on this, an embodiment provides a beam configuration method, which may be applied to the communication system shown in FIG. 1. The beam configuration method provided in this embodiment is applicable to a beam switching process of the terminal device. Optionally, when a beam is switched, the terminal device may be handed over between serving cells, or may not be handed over between serving cells.

In this method, the terminal device receives a beam configuration message, and the beam configuration message indicates a new beam. The terminal device may determine, at a time at which first duration starting from a first moment is reached, to use the new beam for communication. The first moment is a moment at which the terminal device switches to the new beam, or the first moment is a moment at which the terminal device sends, after switching to the new beam, a first acknowledgement message to a network node (for example, a second network node) on which the new beam is located, or the first moment is a moment at which the terminal device sends a second acknowledgement message for the beam configuration message to a network node (for example, a first network node) on which an old beam is located, or the first moment is a moment at which the terminal device receives the beam configuration message. It can be understood that, in this embodiment, the terminal device and the network node on which the old beam is located, and/or the terminal device and the network node on which the new beam is located may determine a same first moment and same first duration, to ensure consistent understandings on an effective time of the new beam, thereby achieving accurate communication.

Figure 2:
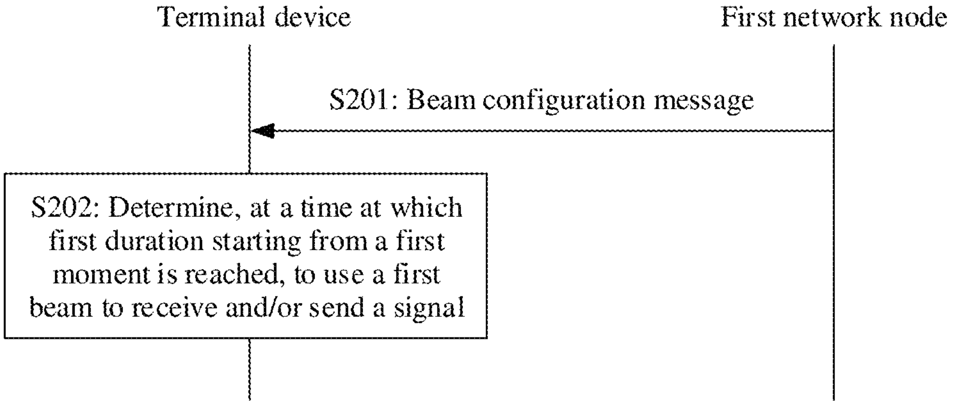
FIG. 2 is a schematic flowchart of beam configuration according to an embodiment.

FIG. 2 shows a possible beam configuration procedure according to an embodiment. The procedure includes the following steps.

S201: A first network node sends a beam configuration message.

Correspondingly, a terminal device receives the beam configuration message.

The beam configuration message indicates a first beam. The first beam is a beam (a downlink receive beam and/or an uplink transmit beam) used by the terminal device to receive and/or send a signal, that is, the first beam is a beam used by the terminal device for communication. In other words, the first beam is a serving beam to which the terminal device switches, and the terminal device may use the first beam to communicate with the network node on which the first beam is located. The first beam may be referred to as a new beam, and a beam used before the terminal device implements switching may be referred to as an old beam. For example, the terminal device switches from a third beam to the first beam, that is, a serving beam of the terminal device is changed from the third beam to the first beam. The third beam is an old beam, and the first beam is a new beam.

Generally, the serving beam is a beam used by the terminal device to receive a PDCCH sent by a network device. In some cases, the serving beam may be further used to receive one or more of the following signals: a PDSCH, a CSI-RS, and the like. The serving beam may be further used to determine a transmit beam for one or more of the following signals: an SRS, a PUCCH, a PUSCH, and the like.

Optionally, the beam configuration message includes a TCI-State, which indicates the first beam. The TCI-State may include a QCL relationship, or a spatial relation. For example, when the first beam is the uplink transmit beam, the first beam may be indicated by using the spatial relation. When the first beam is the downlink receive beam, the first beam may be indicated by using the QCL relationship. Optionally, the beam configuration message may be a downlink control information (DCI) message, or may be MAC CE signaling.

The first network node is a serving network node before the terminal device switches a beam, for example, a network node on which the old beam is located. A second network node is a serving network node after the terminal device switches a beam, for example, a network node on which the new beam (for example, the first beam) is located. The first network node and the second network node may be the same or different. The first network node and the second network node may belong to a same network device (for example, a same base station), or may belong to different network devices (for example, different base stations). The network node may be a network device (for example, a cell or a base station), or may be an antenna or the like. A network node on which a beam is located may also be referred to as a network node corresponding to the beam, a network node to which the beam belongs, a network node that sends the beam, or the like. In embodiments, a network node is used as a cell for description.

In a possible scenario, when a beam is switched, the terminal device may be handed over between network nodes. In this scenario, the first network node and the second network node may be different.

In this scenario, the old beam and the new beam are from different network nodes, and the new beam is from a new serving network node. The first network node on which the old beam before switching is located is a serving network node before the terminal device implements switching, and may be referred to as a source network node (or referred to as an old network node). The second network node on which the new beam after switching is located is a serving network node after the terminal device implements switching, and may be referred to as a target network node (or referred to as a new network node). For example, the serving beam of the terminal device is changed from the third beam to the first beam, a serving network node is changed from the first network node to the second network node, the third beam is the old beam, the first network node on which the third beam is located is the source network node, the first beam is the new beam, and the second network node on which the first beam is located is the target network node.

Optionally, the target network node may be a network node adjacent to the source network node.

In another possible scenario, when switching a beam, the terminal device may not perform network node switching. In this scenario, the first network node and the second network node may be the same.

In this scenario, the old beam and the new beam are from a same network node, and the second network node on which the new beam (for example, the foregoing first beam) is located is the first network node on which the old beam is located.

Optionally, before S201, the terminal device may receive a MAC CE sent by the first network node, the MAC CE is used to activate one or more beams, and the one or more activated beams include the first beam.

S202: The terminal device determines, at a time at which first duration starting from a first moment is reached, to use the first beam to receive and/or send a signal.

In S202, the terminal device may determine an effective time of the new beam. A rule used by the network node on which the old beam is located and/or the target network node on which the new beam is located to determine the effective time of the new beam is the same as a rule used by the terminal device to determine the effective time of the new beam. In other words, the terminal device and the network node on which the old beam is located, and/or the terminal device and the network node on which the new beam is located determine a same first moment and same first duration.

After the effective time of the first beam is reached, that is, after the first beam takes effect, the terminal device may use the first beam to communicate with the second network node on which the first beam is located (briefly referred to as the second network node below). Because the terminal device and the second network node have consistent understandings on the effective time of the beam, the terminal device may use the new beam to receive and/or send a signal at a correct time, and the second network node may use the new beam to send and/or receive a signal at a correct time, to achieve accurate communication.

"Determine to use the first beam to receive and/or send a signal" means determining that the first beam takes effect. For the terminal device, the effective first beam may be used to receive a downlink signal, and/or may be used to send an uplink signal. For the second network node, the effective first beam may be used to send a downlink signal, and/or may be used to receive an uplink signal. Generally, that the first beam takes effect indicates that the terminal device has activated the first beam and has switched to the first beam. Optionally, after the first beam takes effect, the terminal device and the first network node may not use the old beam to receive and/or send a signal.

The first moment may be related to, but is not limited to, one or more of the following information: a moment at which the terminal device switches to the first beam, a moment at which the terminal device is handed over to the second network node on which the first beam is located, a moment at which the terminal device (after switching to the first beam or being handed over to the second network node) sends a first acknowledgement message to the second network node on which the first beam is located, a moment at which the terminal device sends a second acknowledgement message for the beam configuration message to the first network node, a moment at which the terminal device receives the beam configuration message, and the like. For descriptions of the first moment, refer to subsequent descriptions.

The first duration may be related to, but is not limited to, one or more pieces of the following first information: a capability reported by the terminal device, duration required for activating the first beam by the terminal device, duration required for switching a frequency band by the terminal device, duration required for switching a bandwidth part (BWP) by the terminal device, duration required for switching a component carrier (CC) by the terminal device, a time at which a next synchronization signal and PBCH block (SSB) (for example, an SSB of a target cell) arrives, information about whether a TCI state (for example, a TCI state of the target cell) is activated (for example, if activated, the TCI state is set to 0, or if not activated, the TCI state is set to 1), information about whether a target (target) SSB is measured (for example, if measured, the target SSB is set to 1, or if not measured, the target SSB is set to 0), information about whether a target CSI-RS is measured (for example, if measured, the target CSI-RS is set to 1, or if not measured, the target CSI-RS is set to 0), duration required for processing an SSB, duration required for processing a CSI-RS, and the like. Optionally, the duration required for processing the SSB or the duration required for processing the CSI-RS may be related to the capability reported by the terminal device. For example, the first duration may be further related to the moment at which the terminal device receives the beam configuration message and/or the moment at which the terminal device sends the second acknowledgement message. Optionally, the first duration may be existing duration, for example, 3 ms. Alternatively, the first duration may be different from existing duration. For example, the first duration is greater than 3 ms. For descriptions of the first duration, refer to subsequent descriptions.

The first moment is described below in different cases.

In case 1 and case 2, there is random access. When performing beam switching that is based on L1/L2, the terminal device needs to send a random access request to the second network node, to determine uplink timing for the terminal device on the second network node. The uplink timing is used to control a time at which an uplink signal from the terminal device arrives at the second network node, to ensure that times at which signals of different terminal devices arrive at the second network node are basically aligned, and the second network node can correctly decode the uplink signal. It may be understood that, as the network node on which the first beam is located, the second network node may be the same as (for example, the terminal device switches a beam but is not handed over between serving nodes) or different from (for example, the terminal device switches a beam and is handed over between serving nodes) the first network node.

Figure 3:
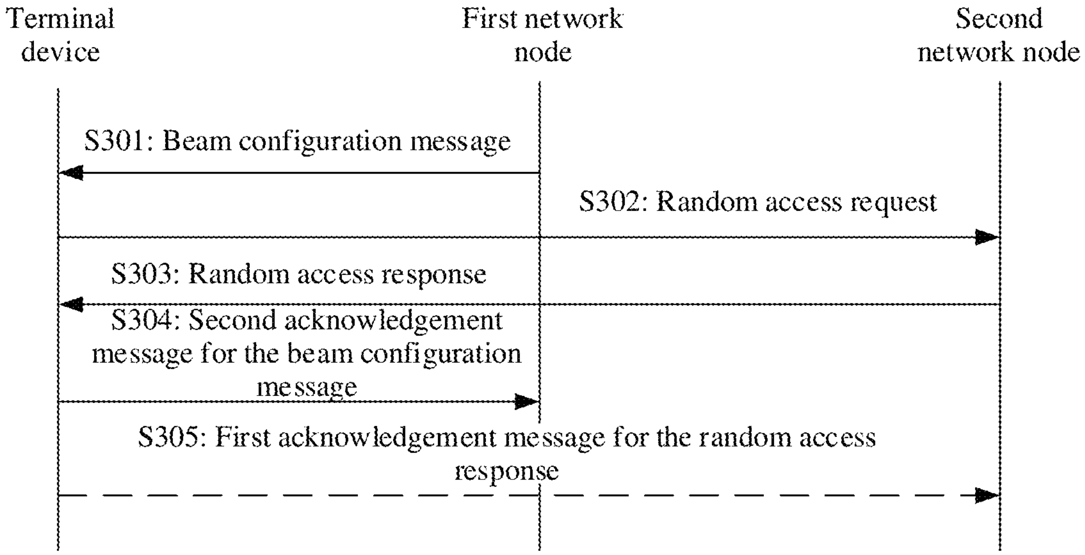
FIG. 3 is a schematic flowchart of beam configuration according to an embodiment.

Case 1 is shown in FIG. 3, and includes the following steps.

S301: The first network node sends the beam configuration message, where the beam configuration message indicates the first beam.

Correspondingly, the terminal device receives the beam configuration message.

Figure 4:
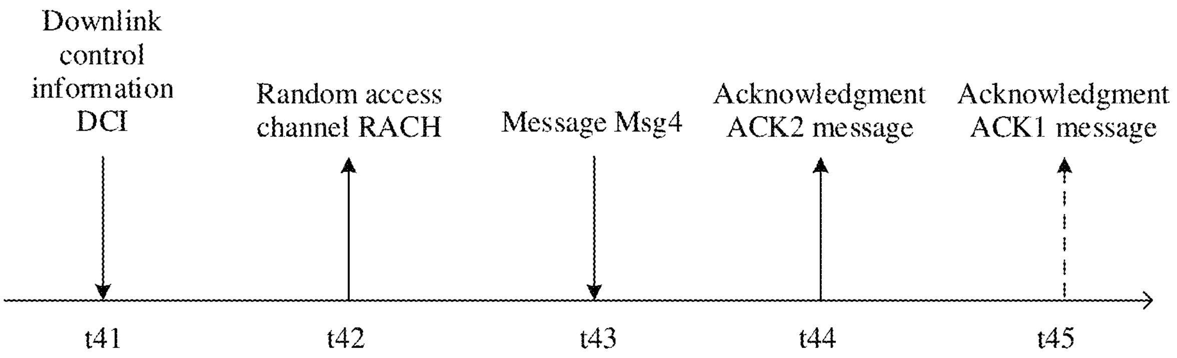
FIG. 4 is a schematic diagram of a beam configuration process according to an embodiment.

As shown in FIG. 4, the terminal device receives DCI at a moment t41, and the DCI is the beam configuration message.

S302: The terminal device sends a random access request to the second network node on which the first beam is located.

Correspondingly, the second network node receives the random access request.

FIG. 4 is still used as an example. The terminal device sends an RACH at a moment t42, and the RACH is the random access request. Optionally, the RACH may be an Msg1 in a random access process, and the RACH includes a random access preamble.

S303: The second network node sends a random access response for the random access request.

Correspondingly, the terminal device receives the random access response. After receiving the random access response, the terminal device may determine that random access is completed. If the terminal device is handed over between serving nodes when a beam is switched, the terminal device may further determine to be handed over to the second network node.

Optionally, the random access response includes indication information of a second beam. The second beam may be the same as or different from the first beam. For example, a width of the second beam is smaller than a width of the first beam. The second network node indicates a narrower second beam to the terminal device, to implement more efficient communication. In a possible implementation, the random access response includes information about QCL-TypeD, to indicate a QCL relationship between the second beam and the first beam. The first terminal device may receive the second beam on the first beam, and the second network node may send the second beam on the first beam.

FIG. 4 is still used as an example. The terminal device receives an Msg4 at a moment t43, and the Msg4 is the random access response.

S304: The terminal device sends the second acknowledgement message for the beam configuration message.

Correspondingly, the first network node receives the second acknowledgement message for the beam configuration message. FIG. 4 is still used as an example. The terminal device sends an acknowledgment (ACK) 2 message at a moment t44, and the ACK2 message is the second acknowledgement message for the beam configuration message.

In this procedure, after random access is completed, the terminal device sends the acknowledgement message to the first network node.

Optionally, in S304, the terminal device sends, on a first transmission resource, the second acknowledgement message for the beam configuration message. The first transmission resource may be indicated by the first network node. A resource period in which the terminal device performs random access is not limited herein, but needs to be greater than a maximum range of the first transmission resource. For example, the resource period in which the terminal device performs random access is from 10 milliseconds (ms) to 160 ms.

In an example, the first transmission resource may be a semi-persistent transmission resource or a periodic transmission resource. In this way, it can be ensured that the terminal device has a resource to send the second acknowledgement message after performing random access.

In another example, a start moment of the first transmission resource is later than N first time units starting from the moment at which the beam configuration message is received, duration of the first transmission resource is second duration, N is a positive integer, and duration of the N first time units is greater than or equal to duration required for the terminal device to be handed over to the second network node. For example, the first network node may add a bit to the DCI to indicate a time offset. The time offset indicates the N first time units. The first time unit may be measured in ms or slots (slot) or the like. For example, the terminal device may feed back the second acknowledgement message in a Yth slot after the N first time units, and Y is a positive integer. The second duration may be any value, and optionally, a value of the second duration is different from a value of the first duration.

In still another example, the start moment of the first transmission resource is later than third duration starting from the moment at which the terminal device receives the random access response message. The terminal device may consider by default that a feedback time of the second acknowledgement message is later than the third duration starting from the moment at which the random access response message is received. The third duration may be any value, and optionally, a value of the third duration is different from the value of the first duration. For example, the third duration may be at a slot level.

Optional S305: The terminal device sends the first acknowledgement message for the random access response.

Correspondingly, the second network node receives the first acknowledgement message for the random access response. FIG. 4 is still used as an example. The terminal device sends an ACK1 message at a moment t45, and the ACK1 message is the first acknowledgement message for the Msg4.

In a possible implementation, the terminal device may use the second beam to send the first acknowledgement message for the Msg4. In another possible implementation, the terminal device may use the first beam to send the first acknowledgement message for the Msg4.

The terminal device may send the first acknowledgement message after fourth duration after S303. The fourth duration may be any value, and optionally, a value of the fourth duration is different from the value of the first duration.

The terminal device, the first network node on which the old beam is located, and the second network node on which the new beam is located may determine the first moment in the following possible manners.

It should be noted that, if the terminal device switches a beam but is not handed over between network nodes, the second network node is the same as the first network node, and the first network node and the second network node have consistent understandings on the effective time of the new beam. The following manners describe cases in which the terminal device switches a beam and is handed over between network nodes, that is, the second network node is different from the first network node.

In possible manner 1, the terminal device may determine, after the first duration starting from the moment at which the ACK2 message (that is, the second acknowledgement message for the beam configuration message) is sent, that the new beam takes effect. In other words, the terminal device may use the moment (for example, the moment t44 in FIG. 4) at which the ACK2 message is sent as the first moment. Correspondingly, the first network node may use a moment at which the ACK2 message is received as the first moment, and determine, after the first duration starting from the moment at which the ACK2 message is received, that the new beam takes effect. In this way, it can be ensured that the terminal device and the first network node have consistent understandings on the effective time of the new beam.

If the terminal device switches a beam and is handed over between network nodes, for the second network node, the second network node may determine, after the first duration starting from a moment at which the Msg4 (that is, the random access response) is sent or the ACK1 message (that is, the first acknowledgement message for the random access response) is received, that the new beam takes effect. Alternatively, the first network node may interact with the second network node. The first network node sends, to the second network node, the moment at which the ACK2 message is received. The second network node may use the moment at which the first network node receives the ACK2 message as the first moment, and determine, after the first duration, that the new beam takes effect. This can ensure that the terminal device, the first network node, and the second network node have consistent understandings on the effective time of the new beam.

In possible manner 2, the terminal device may determine, after the first duration starting from a moment at which the terminal device switches to the first beam, that the new beam takes effect. In other words, the terminal device may use the moment (for example, the moment t43 in FIG. 4) at which the terminal device switches to the first beam as the first moment. Correspondingly, the second network node may determine, after the first duration starting from the moment at which the terminal device switches to the first beam, that the new beam takes effect. In this way, it can be ensured that the terminal device and the second network node have consistent understandings on the effective time of the new beam.

If the terminal device switches a beam and is handed over between network nodes, for the first network node, the first network node may determine, after the first duration starting from a moment at which the beam configuration message is sent or the ACK2 message is received, that the new beam takes effect. Alternatively, the first network node may communicate with the second network node. The second network node may send, to the first network node, the moment at which the terminal device switches to the first beam. The first network node may use the moment at which the terminal device switches to the first beam as the first moment, and determine, after the first duration, that the new beam takes effect. This can ensure that the terminal device, the first network node, and the second network node have consistent understandings on the effective time of the new beam.

In possible manner 3, the terminal device may determine, after the first duration starting from the moment at which the Msg4 (that is, the random access response) is received, that the new beam takes effect. In other words, the terminal device may use a moment (for example, the moment t43 in FIG. 4) at which the terminal device is handed over to the second network node as the first moment. Correspondingly, the second network node may determine, after the first duration starting from a moment at which the Msg4 is sent, that the new beam takes effect. In this way, it can be ensured that the terminal device and the second network node have consistent understandings on the effective time of the new beam.

If the terminal device switches a beam and is handed over between network nodes, for the first network node, the first network node may determine, after the first duration starting from a moment at which the beam configuration message is sent or the ACK2 message is received, that the new beam takes effect. Alternatively, the first network node may communicate with the second network node. The second network node may send, to the first network node, the moment at which the terminal device is handed over to the second network node (or a moment at which the Msg4 is sent). The first network node may use the moment at which the terminal device is handed over to the second network node as the first moment, and determine, after the first duration, that the new beam takes effect. This can ensure that the terminal device, the first network node, and the second network node have consistent understandings on the effective time of the new beam.

In possible manner 4, the terminal device may determine, after the first duration starting from the moment at which the ACK1 message is sent, that the new beam takes effect. In other words, the terminal device may use the moment (for example, the moment t45 in FIG. 4) at which the ACK1 message is sent as the first moment. Correspondingly, the second network node may determine, after the first duration starting from a moment at which the ACK1 message is received, that the new beam takes effect. In this way, it can be ensured that the terminal device and the second network node have consistent understandings on the effective time of the new beam.

If the terminal device switches a beam and is handed over between network nodes, for the first network node, the first network node may determine, after the first duration starting from a moment at which the beam configuration message is sent or the ACK2 message is received, that the new beam takes effect. Alternatively, the first network node may communicate with the second network node. The second network node may send, to the first network node, the moment at which the ACK1 message is received. The first network node may use the moment at which the second network node receives the ACK1 message as the first moment, and determine, after the first duration, that the new beam takes effect. This can ensure that the terminal device, the first network node, and the second network node have consistent understandings on the effective time of the new beam.

In some possible cases, if the terminal device fails to switch a beam, the first network node may resend a beam configuration message to the terminal device by using a serving beam of the terminal device. Optionally, if the ACK2 message is not received after fifth duration starting from a moment at which the beam configuration message is sent, the first network node may determine that the terminal device fails to switch a beam. The fifth duration may be any value, and optionally, a value of the fifth duration may be different from the value of the first duration. For example, the fifth duration may be at an ms level. Herein, the serving beam of the terminal is a serving beam (for example, which may be the foregoing third beam) used before the terminal device implements beam switching, that is, a beam successfully indicated by the first network node last time.

Optionally, if the terminal device fails to switch to the first beam, or the terminal device fails to be handed over to the second network node, or the terminal device does not receive the Msg4, the terminal device may keep a current serving beam unchanged, for example, still use the third beam as the serving beam.

Figure 5:
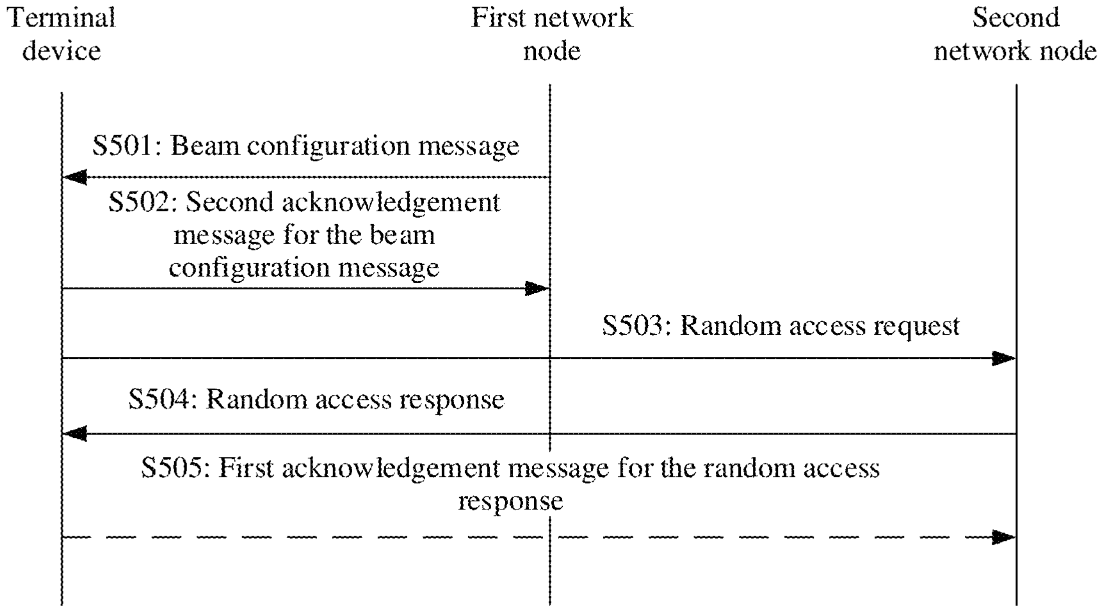
FIG. 5 is a schematic flowchart of beam configuration according to an embodiment.

Case 2 is shown in FIG. 5, and includes the following steps.

For S501, refer to S301.

Figure 6:
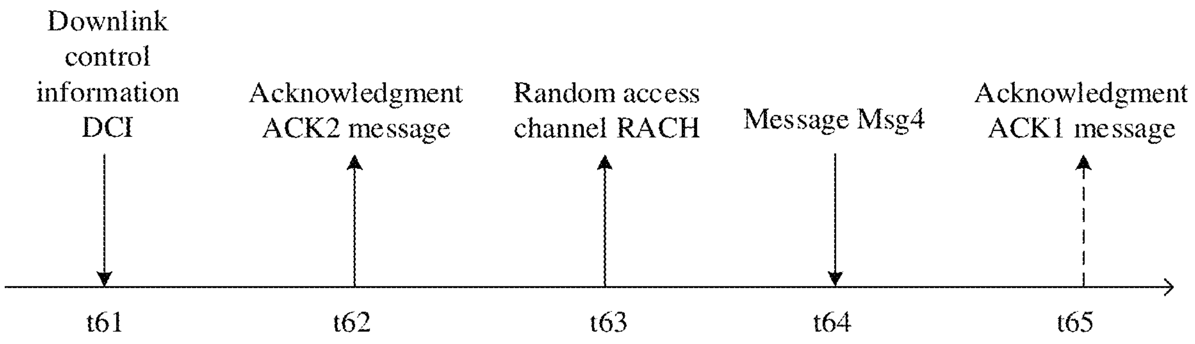
FIG. 6 is a schematic diagram of a beam configuration process according to an embodiment.

As shown in FIG. 6, the terminal device receives DCI at a moment t61, and the DCI is the beam configuration message.

S502: The terminal device sends the second acknowledgement message for the beam configuration message.

Correspondingly, the first network node receives the second acknowledgement message for the beam configuration message. FIG. 6 is still used as an example. The terminal device sends an ACK2 message at a moment t62, and the ACK2 message is the second acknowledgement message for the beam configuration message.

In this procedure, after receiving the beam configuration message (S501), the terminal device sends the acknowledgement message to the first network node.

S503: The terminal device sends a random access request to the second network node.

Correspondingly, the second network node receives the random access request. FIG. 6 is still used as an example. The terminal device sends an RACH at a moment t63, and the RACH is the random access request.

S504: The second network node sends a random access response for the random access request.

Correspondingly, the terminal device receives the random access response. After receiving the random access response, the terminal device may determine that random access is completed. If the terminal device is handed over between serving nodes when a beam is switched, the terminal device may further determine to be handed over to the second network node.

FIG. 6 is still used as an example. The second network node sends an Msg4 at a moment t64, and the Msg4 is the random access response.

Optional S505: The terminal device sends the first acknowledgement message for the random access response.

Correspondingly, the second network node receives the first acknowledgement message for the random access response. FIG. 6 is still used as an example. The terminal device sends an ACK1 message at a moment t65, and the ACK1 message is the first acknowledgement message for the Msg4.

In case 2, for a manner in which the terminal device, the first network node on which the old beam is located, and the second network node on which the new beam is located determine the first moment, refer to case 1. Similarities are not described again.

In case 3 and case 4, there is no random access. When performing beam switching that is based on L1/L2, the terminal device does not need to send a random access request to the second network node. The terminal device may determine uplink timing for the terminal device on the second network node in another manner (which is not limited herein), or it may be assumed that the terminal device and the first network node use same uplink timing. It may be understood that, as the network node on which the first beam is located, the second network node may be the same as (for example, the terminal device switches a beam but is not handed over between serving nodes) or different from (for example, the terminal device switches a beam and is handed over between serving nodes) the first network node.

Figure 7:
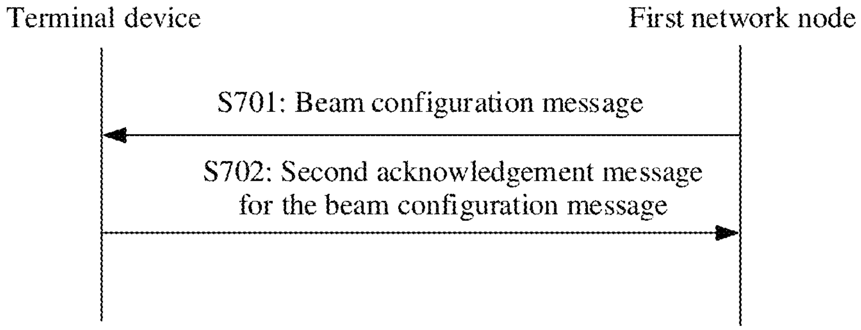
FIG. 7 is a schematic flowchart of beam configuration according to an embodiment.

Case 3 is shown in FIG. 7, and includes the following steps.

S701: The first network node sends the beam configuration information.

Correspondingly, the terminal device receives the beam configuration information.

S702: The terminal device sends the second acknowledgement message (for example, an ACK2 message) for the beam configuration message.

Correspondingly, the first network node receives the second acknowledgement message for the beam configuration message.

The terminal device may send the second acknowledgement message after sixth duration after S701. The sixth duration may be any value, and optionally, a value of the sixth duration is different from the value of the first duration.

The terminal device, the first network node on which the old beam is located, and the second network node on which the new beam is located may determine the first moment in the following possible manners.

In possible manner 1, the terminal device may determine, after the first duration starting from a moment at which the ACK2 message (that is, the second acknowledgement message for the beam configuration message) is sent, that the new beam takes effect. In other words, the terminal device may use the moment at which the ACK2 message is sent as the first moment. Correspondingly, the first network node may determine, after the first duration starting from a moment at which the ACK2 message is received, that the new beam takes effect. In this way, it can be ensured that the terminal device and the first network node have consistent understandings on the effective time of the new beam.

If the terminal device is handed over between network nodes when a beam is switched, for the second network node, the second network node may determine, after the first duration starting from a moment at which the terminal device switches to the first beam or is handed over to the second network node, that the new beam takes effect. Alternatively, the first network node may interact with the second network node. The first network node sends, to the second network node, the moment at which the ACK2 message is received. The second network node may use the moment at which the first network node receives the ACK2 message as the first moment, and determine, after the first duration, that the new beam takes effect. This can ensure that the terminal device, the first network node, and the second network node have consistent understandings on the effective time of the new beam.

In possible manner 2, the terminal device may determine, after the first duration starting from a moment at which the beam configuration message is received, that the new beam takes effect. In other words, the terminal device uses the moment at which the beam configuration message is received as the first moment. Correspondingly, the first network node may determine, after the first duration starting from a moment at which the beam configuration message is sent, that the new beam takes effect. In this way, it can be ensured that the terminal device and the first network node have consistent understandings on the effective time of the new beam.

If the terminal device is handed over between network nodes when a beam is switched, for the second network node, the second network node may determine, after the first duration starting from a moment at which the terminal device switches to the first beam or is handed over to the second network node, that the new beam takes effect. Alternatively, the first network node may interact with the second network node. The first network node sends, to the second network node, the moment at which the beam configuration message is sent. The second network node may use the moment at which the first network node sends the beam configuration message as the first moment, and determine, after the first duration, that the new beam takes effect. This can ensure that the terminal device, the first network node, and the second network node have consistent understandings on the effective time of the new beam.

Case 4 is similar to case 3, and a difference lies in that the terminal device may send the second acknowledgement message after a specified condition is met.

The specified condition is flexible, and there may be one or more specified conditions. Optionally, the specified condition may be that sixth duration after S701 is reached. In other words, case 3 may be used as an example of case 4.

The first duration is described below in different cases. It may be understood that the following different cases may be used separately or in combination. During combined use, a maximum value may be selected from duration determined based on different first information (or combination information of different first information) as the first duration (or the first duration may be greater than the maximum value), or a sum of duration determined based on different first information may be used as the first duration (or the first duration may be greater than the sum of the duration), or one of duration determined based on different first information may be selected as the first duration (or the first duration may be greater than the selected duration).

The first duration may be specified in a protocol, or may be configured by a network node (which may be the first network node or the second network node) for the terminal device, or may be obtained through negotiation by the terminal device and a network node. The first duration may be understood as duration required for a beam to take effect.

An example is as follows.

When the first duration is determined based on one piece of duration in the first information, the first duration may be based on the duration, or the first duration may be greater than the duration, or the first duration may be a sum of the duration and a value (for example, a specified value). The duration may be one of the following: duration required for activating the first beam by the terminal device, duration required for switching a frequency band by the terminal device, duration required for switching a BWP by the terminal device, and duration required for switching a CC by the terminal device.

When the first duration is determined based on two pieces of duration in the first information, the first duration may be maximum duration (or a minimum value or any value) in the two pieces of duration, or the first duration may be greater than the maximum duration, or the first duration may be a sum of (or a difference between) the maximum duration and a value, or the first duration may be a sum of the two pieces of duration, or the first duration may be greater than the sum of the two pieces of duration, or the first duration may be a sum of (or a difference between) the two pieces of duration and a value. The two pieces of duration may be two of the following: duration required for activating the first beam by the terminal device, duration required for switching a frequency band by the terminal device, duration required for switching a BWP by the terminal device, and duration required for switching a CC by the terminal device.

For a manner in which the first duration is determined based on more than two pieces of duration in the first information, refer to the manner in which the first duration is determined based on one or two pieces of duration in the first information. Similarities are not described again.

Optionally, the first duration may include T2, and T2 is related to at least one piece of the first information. T2 may be determined in a manner in this example, or T2 may be determined according to another formula (for example, Formula 4 or Formula 5).

Alternatively, for example, the first duration may be further related to a moment at which the terminal device receives the beam configuration message and/or a moment at which the terminal device sends the second acknowledgement message. Duration may be determined based on different first information according to the following formula.

For example, the first duration may satisfy Formula 1:

$$T=T1+T2 \quad \text{Formula 1}$$

T is the first duration, T1 may be related to a moment at which the terminal device receives the beam configuration message and a moment at which the terminal device sends the second acknowledgement message, and T2 may be related to at least one piece of the first information.

In a possible implementation, T1 may satisfy Formula 2:

$$T1=T_{HARQ} \quad \text{Formula 2}$$

$T_{HARQ}$ may be a time difference between a moment at which the terminal device sends the second acknowledgement message and a moment at which the terminal device receives the beam configuration message.

In another possible implementation, T1 may be further related to a quantity of slots (slot) in one subframe (subframe). For example, T1 may satisfy Formula 3:

$$T1 = T_{HARQ} + 3N_{slot}^{subframe,\mu} \quad \text{Formula 3}$$

$$3N_{slot}^{subframe,\mu}$$

indicates a quantity of slots for a subcarrier spacing p in one subframe.

In a possible implementation, T2 may satisfy Formula 4:

$$T2=TO_k\times(T_{first}+T_{proc})+T_{22} \quad \text{Formula 4}$$

$TO_k$ may be related to one or more of the following: whether a TCI state is activated, whether a target SSB is measured, or whether a target CSI-RS is measured. Optionally, a value of $TO_k$ may be 0 or 1. For example, when the TCI state is activated, $TO_k$ is 0 (or 1). When the TCI state is not activated, $TO_k$ is 1 (or 0). For another example, when the target SSB is measured, $TO_k$ is 1 (or 0). When the target SSB is not measured, $TO_k$ is 0 (or 1). For another example, when the target CSI-RS is measured, $TO_k$ is 1 (or 0). When the target CSI-RS is not measured, $TO_k$ is 0 (or 1).

$T_{first}$ may be related to a moment at which the terminal device receives the beam configuration message and/or a moment at which the terminal device receives a first signal sent by the second network node. For example, the first signal sent by the second network node may be a first (or non-first) SSB, and $T_{first}$ may be duration starting from a time at which the terminal device finishes decoding the beam configuration message to a time at which the terminal device receives the first SSB. For another example, the first signal sent by the second network node may be a first (or non-first) CSI-RS, and $T_{first}$ may be duration starting from a time at which the terminal device finishes decoding the beam configuration message to a time at which the terminal device receives the first CSI-RS.

$T_{proc}$ may be related to duration for processing the first signal by the terminal device. For example, $T_{proc}$ may be duration required for processing an SSB or a CSI-RS by the terminal device. Optionally, $T_{proc}$ may be related to a capability of the terminal device.

For ease of description, $TO_k\times(T_{first}+T_{proc})$ may also be represented as $T_{21}$ herein.

$T_{22}$ may be related to at least one piece of the first information. Optionally, $T_{22}$ may be determined based on one or more pieces of duration in the first information.

In another possible embodiment, T2 may be further related to a slot length (slot length). For example, T2 may satisfy Formula 5:

$$T2=(TO_k\times(T_{first}+T_{proc})+T_{22})\div(\text{slot length}) \quad \text{Formula 5}$$

For a value of the slot length, refer to a regulation of a communication protocol (for example, NR or LTE). This is not limited herein. It should be noted that, in Formula 5, the value of Formula 4 is converted into a slot level, that is, a quantity of required slots is indicated, or may be converted into another time unit, for example, a frame level or an orthogonal frequency division multiplexing (OFDM) level. This is not limited herein.

Several possible cases are described below.

Case 1: The first duration is related to a capability reported by the terminal device.

For example, the terminal device may directly report required duration, and the network node uses the duration reported by the terminal device as the first duration and then configures the first duration for the terminal device.

For another example, the terminal device may report a capability of the terminal device, and the network node may store correspondences between different capabilities and duration, so that the network node determines corresponding first duration based on the capability reported by the terminal device. The terminal device may store correspondences between different capabilities and duration, to determine first duration corresponding to capability information of the terminal device.

Optionally, a higher capability of the terminal device indicates shorter first duration, and a lower capability of the terminal device indicates longer first duration.

The capability of the terminal device may be a hardware capability of the terminal device.

Optionally, one or more pieces of duration in the first information may include the capability of the terminal device. In other words, impact caused by the capability of the terminal device is considered for values of one or more pieces of duration in the first information.

Case 2: The first duration is related to duration required for activating the first beam by the terminal device.

The duration required for activating the first beam by the terminal device may be duration required for establishing synchronization and a connection to the new beam and the second network node by the terminal device.

Optionally, the duration may include a capability of the terminal device. Duration required for activating the first beam by terminal devices with different capabilities may be different.

Case 3: The first duration is related to duration required for switching a frequency band by the terminal device.

Compared with a case in which the second network node and the first network node operate at a same frequency, when the second network node and the first network node operate on a same band but at different frequencies (inter frequency) or on different bands (inter band), the terminal device performs a cross-frequency operation, and additional time may be required for switching a radio frequency channel, adjusting a crystal oscillator frequency, and the like. Therefore, impact of duration required for switching a frequency band by the terminal device on the first duration may be considered.

For example, the terminal device switches from a beam 1 to a beam 2. If the terminal device performs intra-cell beam switching, that is, the beam 1 and the beam 2 belong to a same cell, duration required for switching from the beam 1 to the beam 2 by the terminal device is A1. If the terminal device performs inter-cell beam switching, that is, the beam 1 and the beam 2 are in different cells (for example, the beam 1 corresponds to a cell 1, and the beam 2 corresponds to a cell 2), duration required for switching from the beam 1 to the beam 2 by the terminal device is A2. A1 is less than or equal to A2. Optionally, whether it is "less than" or "equal to" depends on a capability reported by the terminal device. Duration required for switching a beam when the cell 1 and the cell 2 operate at a same frequency is shorter than duration required for switching a beam when the cell 1 and the cell 2 operate at different frequencies.

Optionally, the duration may include a capability of the terminal device. Duration required for switching a frequency band by terminal devices with different capabilities may be different.

Case 4: The first duration is related to duration required for switching a BWP by the terminal device.

Optionally, after the terminal device is handed over to the second network node, the first duration may be affected differently depending on whether a BWP on which the terminal device initially operates is within or outside a range of a currently activated BWP.

When switching a BWP, the terminal device may need to process BWP configuration signaling and frequency range retuning (FR retuning), and set time for analog digital converter (ADC)/digital analog convert (DAC), and the like.

Duration required for switching a BWP may be further related to whether the terminal device is in a high frequency or a low frequency.

A BWP on which the terminal device initially operates on the second network node may be a BWP indicated by the second network node by using an SSB, or a BWP corresponding to random access performed by the terminal device, or a BWP corresponding to a PDCCH resource received by the terminal device on the second network node, or may be a preconfigured BWP.

In a possible implementation, when duration required for beam switching within a network node is less than duration required for BWP switching, if BWP switching is performed, the terminal device and the network node may determine the first duration based on the duration required for BWP switching. When duration required for beam switching within a network node is greater than duration required for BWP switching, if BWP switching is performed, the terminal device and the network node may determine the first duration based on the duration required for beam switching within the network node.

For example, a beam 1 corresponds to a BWP 1, and a beam 2 corresponds to a BWP 2. If the terminal device switches from the beam 1 to the beam 2, that is, switches from the BWP 1 to the BWP 2, duration required for beam switching when the BWP 1 and the BWP 2 are within a range of one BWP is shorter than duration required for beam switching when the BWP 1 and the BWP 2 are within ranges of different BWPs. Considering that the beam 1 and the beam 2 are at a same frequency or different frequencies, duration required for beam switching in a scenario of different frequencies may be longer than duration required for beam switching in a scenario of a same frequency.

Optionally, the duration may include a capability of the terminal device. Duration required for switching a BWP by terminal devices with different capabilities may be different.

Case 5: The first duration is related to duration required for switching a CC by the terminal device.

Optionally, the second network node is located outside a band (band) on which the first network node is located, or outside a frequency range (FR) on which the first network node is located. Impact of duration required for switching a CC by the terminal device on the first duration may be considered.

"Band" may be a band specified in a protocol, or may be another possible band. The frequency range may be a frequency range specified in a protocol, for example, an FR1 and an FR2. The FR1 is a frequency band range with a frequency less than (less than or equal to) 6 gigahertz (GHz), and the FR2 is a frequency band range with a frequency greater than (greater than or equal to) 6 GHz. Additionally, the frequency range may also be another possible frequency band range.

For example, a cell 1 corresponds to a CC 1, and a cell 2 corresponds to a CC 2. If the CC 1 and the CC 2 are on a same frequency band, duration required for switching from the CC 1 to the CC 2 by the terminal device is A. If the CC 1 and the CC are on different frequency bands, duration required for switching from the CC 1 to the CC 2 by the terminal device is B. A is less than B. Optionally, first duration (that is, an effective time of a beam) determined based on A is shorter than first duration determined based on B.

Optionally, the duration may include a capability of the terminal device. Duration required for switching a CC by terminal devices with different capabilities may be different.

According to the beam configuration method provided in embodiments, when the terminal device switches a beam, the terminal device and the network node on which the old beam is located, and/or the terminal device and the network node on which the new beam is located may determine a same first moment and same first duration, to ensure consistent understandings on the effective time of the new beam, thereby achieving accurate communication.

An embodiment further provides a beam configuration method. In this method, the terminal device may send a random access request to the second network node, and the second network node sends a random access response to the terminal device. The random access response includes indication information of a second beam.

The second network node may use a moment at which the random access response is sent as a second moment, and determine, at a time at which seventh duration starting from the second moment is reached, to use the second beam for communication. Correspondingly, the terminal device uses a moment at which the random access response is received as the second moment, and determines, at the time at which the seventh duration starting from the second moment is reached, to use the second beam for communication. The terminal device and the second network node have consistent understandings on an effective time of the second beam, so that accurate communication can be achieved. The seventh duration may be any value, and optionally, a value of the seventh duration is different from the value of the first duration.

In some cases, the terminal device may determine, within a period of time (which does not exceed the seventh duration) starting from the moment at which the terminal device receives the random access response, that the second beam does not take effect. In this case, the terminal device may send a first acknowledgement message for the random access response by using the first beam, and the second network node receives the first acknowledgement message by using the first beam.

In some other cases, the terminal device may determine, after a period of time (which exceeds the seventh duration) starting from the moment at which the terminal device receives the random access response, that the second beam takes effect. In this case, the terminal device may send a first acknowledgement message by using the second beam, and the second network node may receive the first acknowledgement message by using the second beam.

In some other cases, the second beam takes effect after the terminal device determines to send a first acknowledgement message. In this case, the terminal device may send the first acknowledgement message for the random access response by using the first beam, and the second network node receives the first acknowledgement message by using the first beam.

In this method, the terminal device and the second network node have consistent understandings on the effective time of the second beam, so that accurate communication can be achieved.

In embodiments, unless otherwise stated or there is a logic conflict, terms and/or descriptions between different embodiments are consistent and may be mutually referenced, and features in different embodiments may be combined based on an internal logical relationship thereof, to form a new embodiment.

It may be understood that, in the foregoing embodiments, the method and/or the step implemented by the transmit end may also be implemented by a component (for example, a chip or a circuit) that may be used in the transmit end, and the method and/or the step implemented by the receive end may also be implemented by a component that may be used in the receive end.

Figure 8:
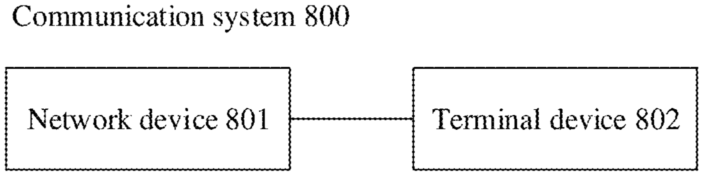
FIG. 8 is a schematic diagram of an architecture of a communication system according to an embodiment.

Based on a same concept as the foregoing beam configuration method, an embodiment further provides a communication system. As shown in FIG. 8, a communication system 800 includes a network device 801 and a terminal device 802. The network device 801 and the terminal device 802 may implement the methods described in the foregoing method embodiments. The network device 801 may be the first network node and/or the second network node.

Figure 9:
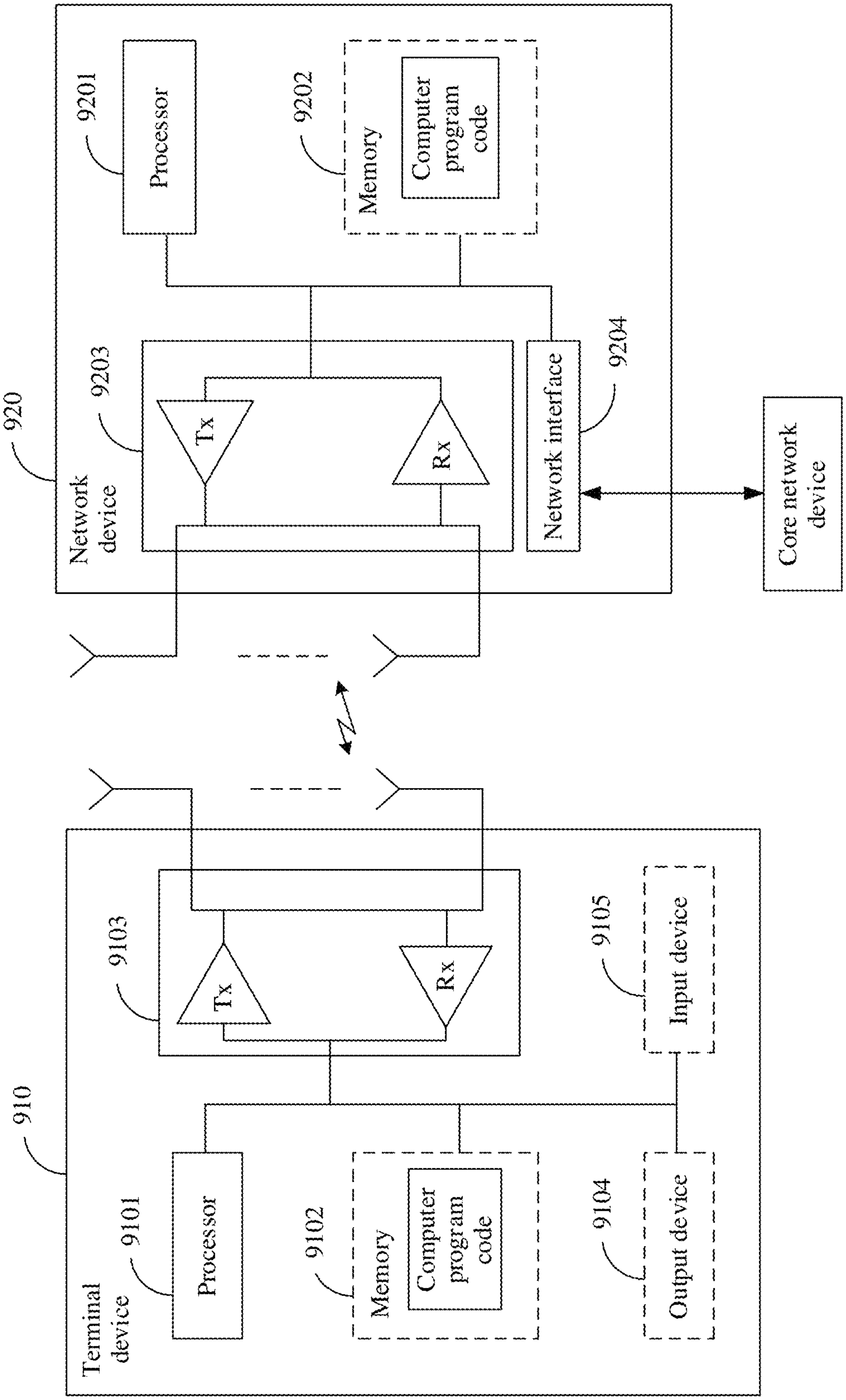
FIG. 9 is a schematic diagram of an architecture of a communication system according to an embodiment.

Optionally, FIG. 9 is a schematic diagram of structures of a terminal device 910 and a network device 920 according to an embodiment. The network device 920 may be a first network node or a second network node, or may be located on the first network node or the second network node. FIG. 9 does not show a schematic diagram of a structure of the first network node or the second network node.

The terminal device 910 includes at least one processor (an example in which one processor 9101 is included is used for description in FIG. 9) and at least one transceiver (an example in which one transceiver 9103 is included is used for description in FIG. 9). Optionally, the terminal device 910 may further include at least one memory (an example in which one memory 9102 is included is used for description in FIG. 9), at least one output device (an example in which one output device 9104 is included is used for description in FIG. 9), and at least one input device (an example in which one input device 9105 is included is used for description in FIG. 9).

The processor 9101, the memory 9102, and the transceiver 9103 are connected to each other through a communication line. The communication line may include a path for transmitting information between the foregoing components.

The processor 9101 may be a general-purpose central processing unit (CPU), a microprocessor, an application-specific integrated circuit (ASIC), one or more integrated circuits configured to control program execution of the solutions, a general-purpose processor, a digital signal processor (DSP), a field programmable gate array (FPGA) or another programmable logic device, a discrete gate or transistor logic device, or a discrete hardware component. The processor may implement or perform the methods, the steps, and logical block diagrams that are in embodiments. The general-purpose processor may be a microprocessor, or the processor may be any conventional processor or the like. The steps of the methods with reference to embodiments may be directly executed and completed by a hardware decoding processor, or may be executed and completed by using a combination of hardware and software modules in the decoding processor. The software module may be in a storage medium, and the storage medium is located in the memory 9102. Further, the storage medium may be a non-transitory computer readable storage medium.

The memory 9102 may be a volatile memory or a nonvolatile memory or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through an example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described includes, but is not limited to, these memories and any memory of another proper type. The memory may exist independently, and is connected to the processor through a communication line. Alternatively, the memory may be integrated with the processor.

The memory 9102 is configured to store computer-executable instructions for executing the solutions of the embodiments, and the processor 9101 controls the execution. The processor 9101 is configured to execute the computer-executable instructions stored in the memory 9102, to implement a beam configuration method provided in the following embodiment.

Optionally, the computer-executable instructions in embodiments may also be referred to as application program code or computer program code or instructions. This is not limited.

The output device 9104 communicates with the processor 9101, and may display information in a plurality of manners. For example, the output device 9104 may be a liquid crystal display (LCD), a light emitting diode (LED) display device, a cathode ray tube (CRT) display device, a projector (projector), or the like. The input device 9105 communicates with the processor 9101, and may receive a user input in a plurality of manners. For example, the input device 9105 may be a mouse, a keyboard, a touchscreen device, a sensor device, or the like.

The transceiver 9103 may use any transceiver-type apparatus, and is configured to communicate with another device or a communication network, for example, the Ethernet, a radio access network (RAN), or a wireless local area network (WLAN). The transceiver 9103 includes a transmitter (Tx) and a receiver (Rx).

The memory 9102 may exist independently, and is connected to the processor 9101 through a communication line. Alternatively, the memory 9102 may be integrated with the processor 9101.

The memory 9102 is configured to store computer-executable instructions for executing the solutions of the embodiments, and the processor 9101 controls the execution. For example, the processor 9101 is configured to execute the computer-executable instructions stored in the memory 9102, to implement the beam configuration method in embodiments.

Alternatively, optionally, in embodiments, the processor 9101 may perform processing-related functions in the method provided in the foregoing embodiment, and the transceiver 9103 is responsible for communicating with another device or a communication network. This is not limited.

The network device 920 includes at least one processor (an example in which one processor 9201 is included is used for description in FIG. 9), at least one transceiver (an example in which one transceiver 9203 is included is used for description in FIG. 9), and at least one network interface (an example in which one network interface 9204 is included is used for description in FIG. 9). Optionally, the network device 920 may further include at least one memory (an example in which one memory 9202 is included is used for description in FIG. 9). The processor 9201, the memory 9202, the transceiver 9203, and the network interface 9204 are connected to each other through a communication line. The network interface 9204 is configured to connect to a core network device through a link (for example, an S1 interface), or connect to a network interface of another network device through a wired or wireless link (for example, an X2 interface) (not shown in FIG. 9). This is not limited in embodiments. In addition, for related descriptions of the processor 9201, the memory 9202, and the transceiver 9203, refer to the descriptions of the processor 9101, the memory 9102, and the transceiver 9103 in the terminal device 910. Details are not described herein again.

It may be understood that the structures shown in FIG. 9 do not constitute any limitation on the terminal device 910 or the network device 920. For example, in some other embodiments, the terminal device 910 or the network device 920 may include more or fewer components than those shown in the figure, or some components may be combined, or some components may be split, or the components may be differently arranged. The components shown in the figure may be implemented by hardware, software, or a combination of software and hardware.

Figure 10:
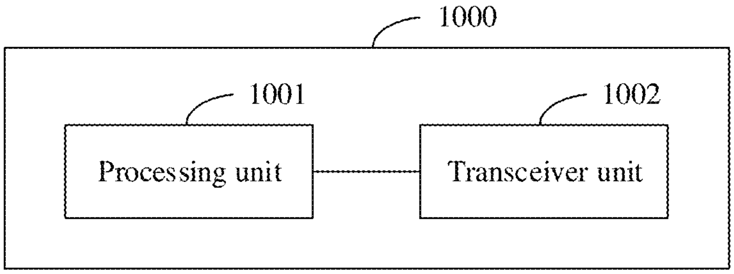
FIG. 10 is a schematic diagram of a structure of a communication apparatus according to an embodiment.

Based on a same concept as the foregoing beam configuration method, an embodiment further provides a communication apparatus. As shown in FIG. 10, a communication apparatus 1000 includes a processing unit 1001 and a transceiver unit 1002. The communication apparatus 1000 may be configured to implement the methods described in the foregoing method embodiments. The apparatus 1000 may be used in a terminal device or a network node or may be located in a terminal device or a network node.

In a possible embodiment, the apparatus 1000 is a terminal device.

The transceiver unit 1002 is configured to receive a beam configuration message sent by a first network node, where the beam configuration message indicates a first beam, and the first beam is a beam used by the terminal device to receive and/or send a signal.

The processing unit 1001 is configured to determine, at a time at which first duration starting from a first moment is reached, to use the first beam to receive and/or send a signal.

The first moment is a moment at which the terminal device switches to the first beam, or the first moment is a moment at which the terminal device sends, after switching to the first beam, a first acknowledgement message to a second network node on which the first beam is located, or the first moment is a moment at which the terminal device sends a second acknowledgement message for the beam configuration message to the first network node, or the first moment is a moment at which the terminal device receives the beam configuration message.

In an implementation, the transceiver unit 1002 is further configured to: when the first moment is the moment at which the terminal device switches to the first beam, send a random access request to the second network node on which the first beam is located, and receive a random access response message sent by the second network node.

In an implementation, the transceiver unit 1002 is further configured to: when the first moment is the moment at which the terminal device sends the second acknowledgement message for the beam configuration message to the first network node, send a random access request to the second network node on which the first beam is located, receive a random access response message sent by the second network node, and send the second acknowledgement message for the beam configuration message to the first network node.

In an implementation, the transceiver unit 1002 is further configured to: when the first moment is the moment at which the terminal device sends, after switching to the first beam, the first acknowledgement message to the second network node on which the first beam is located, send a random access request to the second network node, receive a random access response message sent by the second network node, and send the first acknowledgement message for the random access response message to the second network node.

In an implementation, the transceiver unit 1002 is further configured to: when the first moment is the moment at which the terminal device switches to the first beam, or the first moment is the moment at which the terminal device sends the second acknowledgement message for the beam configuration message to the first network node, send the second acknowledgement message for the beam configuration message to the first network node, send a random access request to the second network node on which the first beam is located, and receive a random access response message sent by the second network node.

In an implementation, the transceiver unit 1002 is further configured to: when the first moment is the moment at which the terminal device sends, after switching to the first beam, the first acknowledgement message to the second network node on which the first beam is located, send the second acknowledgement message for the beam configuration message to the first network node, send a random access request to the second network node, receive a random access response message sent by the second network node, and send the first acknowledgement message for the random access response message to the second network node.

In an implementation, the random access response message includes indication information of a second beam.

The transceiver unit 1002 is configured to send the first acknowledgement message for the random access response message to the second network node by using the second beam.

In an implementation, the transceiver unit 1002 is further configured to: when the first moment is the moment at which the terminal device sends the second acknowledgement message for the beam configuration message to the first network node, send the second acknowledgement message for the beam configuration message to the first network node.

In an implementation, the processing unit 1001 is further configured to: when the first moment is the moment at which the terminal device receives the beam configuration message, determine that the moment at which the beam configuration message is received is the first moment.

In an implementation, the first duration is determined based on at least one piece of the following first information: duration required for switching a frequency band by the terminal device, duration required for switching a BWP by the terminal device, duration required for activating the first beam by the terminal device, duration required for switching a CC by the terminal device, and a capability reported by the terminal device.

In an implementation, the first duration further includes T2, and T2 satisfies the following formula:

$T2=TO_k\times(T_{first}+T_{proc})+T_{22}$, where $TO_k$ is 0 or 1, $T_{first}$ is related to the moment at which the terminal device receives the beam configuration message and a moment at which the terminal device receives a first signal sent by the second network node, $T_{proc}$ is related to duration for processing the first signal by the terminal device, and $T_{22}$ is related to the at least one piece of first information.

In an implementation, the first duration is further related to the moment at which the terminal device receives the beam configuration message and/or the moment at which the terminal device sends the second acknowledgement message.

It should be noted that, in embodiments, division into modules is an example, and is only logical function division. During actual implementation, there may be another division manner. In addition, functional units in embodiments may be integrated into one processing unit, or may exist alone physically, or two or more units are integrated into one unit. The integrated unit may be implemented in a form of hardware, or may be implemented in a form of a software functional unit. For example, the transceiver unit may include a receiving unit and/or a sending unit.

When the integrated unit is implemented in the form of a software functional unit and sold or used as an independent product, the integrated unit may be stored in a non-transitory computer-readable storage medium. Based on such an understanding, the integrated unit may be stored in a storage medium as a computer software product, and includes several instructions for instructing a computer device (which may be a personal computer, a server, or a network device) or a processor (processor) to perform all or some of the steps of the methods in embodiments.

Figure 11:
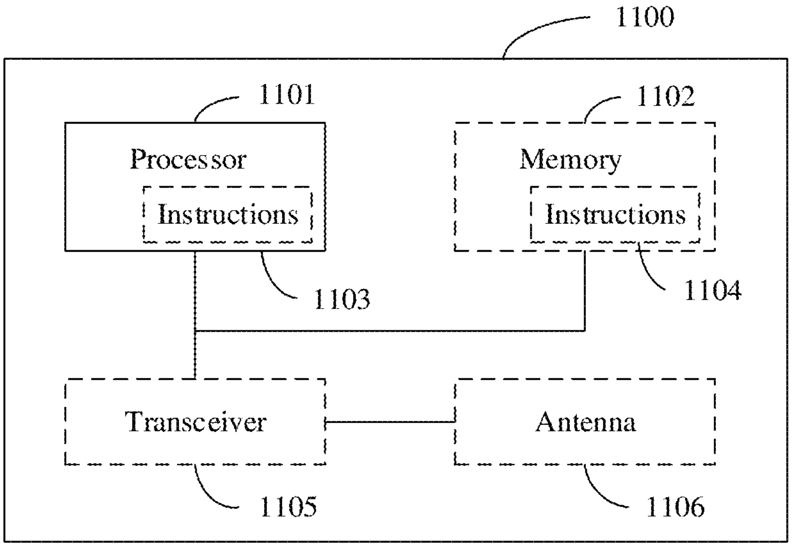
FIG. 11 is a schematic diagram of a structure of a communication apparatus according to an embodiment.

FIG. 11 is a schematic diagram of a structure of a communication apparatus 1100 according to an embodiment. The apparatus 1100 may be configured to implement the methods described in the foregoing method embodiments. Refer to the descriptions in the foregoing method embodiments.

The apparatus 1100 includes one or more processors 1101. The processor 1101 may be a general-purpose processor, a dedicated processor, or the like. For example, the processor may be a baseband processor or a central processing unit. The baseband processor may be configured to process a communication protocol and communication data. The central processing unit may be configured to control the communication apparatus (for example, a base station, a terminal, or a chip), execute a software program, and process data of the software program. The communication apparatus may include a transceiver unit, configured to input (receive) and output (send) signals. For example, the transceiver unit may be a transceiver or a radio frequency chip.

The apparatus 1100 includes one or more processors 1101, and the one or more processors 1101 may implement the methods in the foregoing embodiments.

Optionally, the processor 1101 may further implement another function in addition to the methods in the foregoing embodiments.

Optionally, in an embodiment, the processor 1101 may execute instructions, to enable the apparatus 1100 to perform the methods described in the foregoing method embodiments. All or some of the instructions may be stored in the processor, for example, instructions 1103, or may be stored in a memory 1102 coupled to the processor, for example, instructions 1104. Alternatively, the instructions 1103 and 1104 may be used together to enable the apparatus 1100 to perform the methods described in the foregoing method embodiments. The instructions 1103 are also referred to as a computer program.

In another possible embodiment, the communication apparatus 1100 may further include a circuit, and the circuit may implement a function in the foregoing method embodiments.

In still another possible embodiment, the apparatus 1100 may include one or more memories 1102, and the memory 1102 stores the instructions 1104. The instructions may be run on the processor, to enable the apparatus 1100 to perform the methods described in the foregoing method embodiments. Optionally, the memory may further store data. Optionally, the processor may also store instructions and/or data. For example, the one or more memories 1102 may store the correspondence described in the foregoing embodiments, or a related parameter, table, or the like in the foregoing embodiments. The processor and the memory may be separately disposed, or may be integrated with each other.

In still another possible embodiment, the apparatus 1100 may further include a transceiver 1105 and an antenna 1106. The processor 1101 may be referred to as a processing unit, and is configured to control the apparatus (the terminal or the base station). The transceiver 1105 may be referred to as a transceiver, a transceiver circuit, a transceiver unit, or the like, and is configured to implement a transceiver function of the apparatus by using the antenna 1106.

An embodiment further provides a non-transitory computer-readable medium, and the non-transitory computer-readable medium stores a computer program. When the computer program is executed by a computer, the beam configuration method according to any one of the foregoing method embodiments is implemented.

An embodiment further provides a computer program product, including a computer program. When the computer program is executed by a computer, the beam configuration method according to any one of the foregoing method embodiments is implemented.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer instructions are loaded and executed on a computer, procedures or functions according to embodiments are all or partially generated. The computer may be the foregoing communication apparatus. The computer instructions may be stored in a non-transitory computer-readable storage medium or may be transmitted from a non-transitory computer-readable storage medium to another non-transitory computer-readable storage medium. The non-transitory computer-readable storage medium may be the foregoing storage medium or the foregoing memory.

Figure 12:
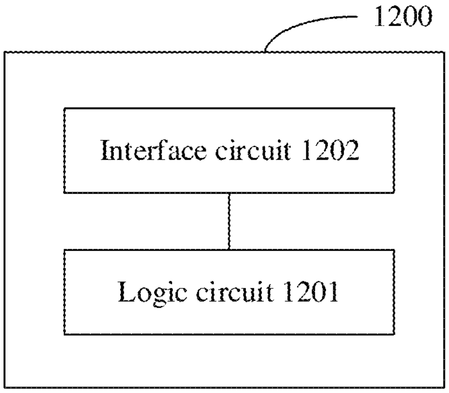
FIG. 12 is a schematic diagram of a structure of a communication apparatus according to an embodiment.

In a possible embodiment, when the communication apparatus is a chip, for example, a chip in a network device, or a chip in a terminal device, a determining unit or the processor 1101 may be one or more logic circuits, and a sending unit or a receiving unit or the transceiver 1105 may be an input/output interface, or may be referred to as a communication interface, an interface circuit, an interface, or the like. Alternatively, the transceiver 1105 may be a sending unit and a receiving unit. The sending unit may be an output interface, and the receiving unit may be an input interface. The sending unit and the receiving unit are integrated into one unit, for example, an input/output interface. As shown in FIG. 12, a communication apparatus 1200 includes a logic circuit 1201 and an interface circuit 1202. For example, the determining unit or the processor 1101 may be implemented by using the logic circuit 1201, and the sending unit or the receiving unit or the transceiver 1105 may be implemented by using the interface circuit 1202. The logic circuit 1201 may be a chip, a processing circuit, an integrated circuit, a system on chip (SoC), or the like. The interface circuit 1202 may be a communication interface, an input/output interface, or the like. In this embodiment, the logic circuit may be further coupled to the interface circuit.

A connection manner of the logical circuit and the interface circuit is not limited in this embodiment.

In some embodiments, the logic circuit and the interface circuit may be configured to perform functions, operations, or the like performed by the network device or the terminal device.

For example, the interface circuit 1202 is configured to receive a beam configuration message sent by a first network node, the beam configuration message indicates a first beam, and the first beam is a beam used by a terminal device to receive and/or send a signal.

The logic circuit 1201 is configured to determine, at a time at which first duration starting from a first moment is reached, to use the first beam to receive and/or send a signal.

For functions or operations performed by the network device or the terminal device, refer to the foregoing method embodiments. Details are not described herein again.

A person of ordinary skill in the art may be aware that, units and algorithm steps in examples described with reference to the embodiments can be implemented by electronic hardware, computer software, or a combination thereof. To clearly describe interchangeability between the hardware and the software, the foregoing has generally described compositions and steps of each example based on functions. Whether these functions are performed by hardware or software depends on particular applications and design constraints of the solutions. A person skilled in the art may use different methods to implement the described functions for each particular application, but it shall not be considered that the implementation goes beyond the scope of the embodiments.

It may be clearly understood by a person skilled in the art that, for convenience and brevity of description, for a specific working process of the foregoing system, apparatus, and unit, refer to a corresponding process in the method embodiments. Details are not described herein again.

It should be understood that, in the several embodiments provided, the system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

Units described as separate parts may or may not be physically separate. Parts displayed as units may or may not be physical units, for example, may be located in one position, or may be distributed on a plurality of network units. Some or all of the units may be selected according to an actual requirement to achieve the objectives of the solutions of embodiments.

In addition, functional units in embodiments may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that the embodiments may be implemented by hardware, firmware, or a combination thereof. When software is used to implement the embodiments, the foregoing functions may be stored in a non-transitory computer-readable medium or transmitted as one or more instructions or code in a non-transitory computer-readable medium. The non-transitory computer-readable medium includes a computer storage medium and a communication medium, and the communication medium includes any medium that enables a computer program to be transmitted from one place to another. The storage medium may be any available medium accessible to a computer.

The foregoing descriptions are merely embodiments of the solutions, but are not intended to limit their=scope. Any modification, equivalent replacement, improvement, or the like made without departing from the principle of the embodiments shall fall within their scope.

What is claimed is:

1. A beam configuration method, comprising:

receiving, by a terminal device, a beam configuration message sent by a first network node, wherein the beam configuration message indicates a first beam, and the first beam is a beam used by the terminal device to receive and/or send a signal;

determining, by the terminal device at a time at which a first duration starting from a first moment is reached, to use the first beam to receive and/or send a signal, wherein the first moment is a moment at which the terminal device switches to the first beam, or the first moment is a moment at which the terminal device sends, after switching to the first beam, a first acknowledgement message to a second network node on which the first beam is located, or the first moment is a moment at which the terminal device sends a second acknowledgement message for the beam configuration message to the first network node, or the first moment is a moment at which the terminal device receives the beam configuration message; and wherein the first duration comprises T2, and T2 satisfies the following formula:

$T2=TO_k\times(T_{first}+T_{proc})+T_{22}$, wherein $TO_k$ is 0 or 1, $T_{first}$ is related to the moment at which the terminal device receives the beam configuration message and a moment at which the terminal device receives a first signal sent by the second network node, $T_{proc}$ is related to duration for processing the first signal by the terminal device, and $T_{22}$ is related to at least one piece of first information.

2. The method according to claim 1, wherein when the first moment is the moment at which the terminal device switches to the first beam, before determining to use the first beam to receive and/or send the signal, the method further comprises:

sending, by the terminal device, a random access request to the second network node on which the first beam is located; and receiving, by the terminal device, a random access response message sent by the second network node.

3. The method according to claim 1, wherein when the first moment is the moment at which the terminal device sends the second acknowledgement message for the beam configuration message to the first network node, before determining to use the first beam to receive and/or send the signal, the method further comprises:

sending, by the terminal device, a random access request to the second network node on which the first beam is located;

receiving, by the terminal device, a random access response message sent by the second network node; and sending, by the terminal device, the second acknowledgement message for the beam configuration message to the first network node.

4. The method according to claim 3, wherein the random access response message comprises indication information of a second beam; and sending, by the terminal device, the first acknowledgement message for the random access response message to the second network node comprises:

sending, by the terminal device, the first acknowledgement message for the random access response message to the second network node by using the second beam.

5. The method according to claim 4, wherein when the first moment is the moment at which the terminal device sends, after switching to the first beam, the first acknowledgement message to the second network node on which the first beam is located, before determining to use the first beam to receive and/or send the signal, the method further comprises:

sending, by the terminal device, a random access request to the second network node;

receiving, by the terminal device, a random access response message sent by the second network node; and sending, by the terminal device, the first acknowledgement message for the random access response message to the second network node.

6. The method according to claim 1, wherein when the first moment is the moment at which the terminal device switches to the first beam, or the first moment is the moment at which the terminal device sends the second acknowledgement message for the beam configuration message to the first network node, before determining to use the first beam to receive and/or send the signal, the method further comprises:

sending, by the terminal device, the second acknowledgement message for the beam configuration message to the first network node;

sending, by the terminal device, a random access request to the second network node on which the first beam is located; and receiving, by the terminal device, a random access response message sent by the second network node.

7. The method according to claim 1, wherein when the first moment is the moment at which the terminal device sends, after switching to the first beam, the first acknowledgement message to the second network node on which the first beam is located, before determining to use the first beam to receive and/or send the signal, the method further comprises:

sending, by the terminal device, the second acknowledgement message for the beam configuration message to the first network node;

sending, by the terminal device, a random access request to the second network node;

receiving, by the terminal device, a random access response message sent by the second network node; and sending, by the terminal device, the first acknowledgement message for the random access response message to the second network node.

8. The method according to claim 1, wherein when the first moment is the moment at which the terminal device sends the second acknowledgement message for the beam configuration message to the first network node, before determining to use the first beam to receive and/or send the signal, the method further comprises:

sending, by the terminal device, the second acknowledgement message for the beam configuration message to the first network node.

9. The method according to claim 1, wherein when the first moment is the moment at which the terminal device receives the beam configuration message, before determining to use the first beam to receive and/or send the signal, the method further comprises:

determining, by the terminal device, that the moment at which the beam configuration message is received is the first moment.

10. The method according to claim 1, wherein the first duration is determined based on at least one piece of the following first information: duration required for switching a frequency band by the terminal device, duration required for switching a bandwidth part (BWP) by the terminal device, duration required for activating the first beam by the terminal device, duration required for switching a component carrier (CC) by the terminal device, and a capability reported by the terminal device.

11. The method according to claim 10, wherein the first duration is further related to the moment at which the terminal device receives the beam configuration message and the moment at which the terminal device sends the second acknowledgement message.

12. A communication apparatus, comprising:

a transceiver configured to receive a beam configuration message sent by a first network node, wherein the beam configuration message indicates a first beam, and the first beam is a beam used by the communication apparatus to receive and/or send a signal;

a processor configured to determine, at a time at which a first duration starting from a first moment is reached, to use the first beam to receive and/or send a signal, wherein the first moment is a moment at which the communication apparatus switches to the first beam, or the first moment is a moment at which the communication apparatus sends, after switching to the first beam, a first acknowledgement message to a second network node on which the first beam is located, or the first moment is a moment at which the communication apparatus sends a second acknowledgement message for the beam configuration message to the first network node, or the first moment is a moment at which the communication apparatus receives the beam configuration message; and wherein the first duration comprises T2, and T2 satisfies the following formula:

$T2=TO_k\times(T_{first}+T_{proc})+T_{22}$, wherein $TO_k$ is 0 or 1, $T_{first}$ is related to the moment at which the communication apparatus receives the beam configuration message and a moment at which the communication apparatus receives a first signal sent by the second network node, $T_{proc}$ is related to duration for processing the first signal by the communication apparatus, and $T_{22}$ is related to at least one piece of first information.

13. The apparatus according to claim 12, wherein the transceiver is further configured to: when the first moment is the moment at which the communication apparatus switches to the first beam, send a random access request to the second network node on which the first beam is located, and receive a random access response message sent by the second network node.

14. The apparatus according to claim 12, wherein the transceiver is further configured to: when the first moment is the moment at which the communication apparatus sends the second acknowledgement message for the beam configuration message to the first network node, send a random access request to the second network node on which the first beam is located, receive a random access response message sent by the second network node, and send the second acknowledgement message for the beam configuration message to the first network node.

15. The apparatus according to claim 12, wherein the transceiver is further configured to: when the first moment is the moment at which the communication apparatus sends, after switching to the first beam, the first acknowledgement message to the second network node on which the first beam is located, send a random access request to the second network node, receive a random access response message sent by the second network node, and send the first acknowledgement message for the random access response message to the second network node.

16. The apparatus according to claim 12, wherein the transceiver is further configured to: when the first moment is the moment at which the communication apparatus switches to the first beam, or the first moment is the moment at which the communication apparatus sends the second acknowledgement message for the beam configuration message to the first network node, send the second acknowledgement message for the beam configuration message to the first network node, send a random access request to the second network node on which the first beam is located, and receive a random access response message sent by the second network node.

17. The apparatus according to claim 12, wherein the transceiver is further configured to: when the first moment is the moment at which the communication apparatus sends, after switching to the first beam, the first acknowledgement message to the second network node on which the first beam is located, send the second acknowledgement message for the beam configuration message to the first network node, send a random access request to the second network node, receive a random access response message sent by the second network node, and send the first acknowledgement message for the random access response message to the second network node.

18. The apparatus according to claim 15, wherein the random access response message comprises indication information of a second beam; and the transceiver is configured to send the first acknowledgement message for the random access response message to the second network node by using the second beam.

19. The apparatus according to claim 12, wherein the transceiver is further configured to: when the first moment is the moment at which the communication apparatus sends the second acknowledgement message for the beam configuration message to the first network node, send the second acknowledgement message for the beam configuration message to the first network node.

20. The apparatus according to claim 12, wherein when the first moment is the moment at which the communication apparatus receives the beam configuration message, the processor is further configured to determine that the moment at which the beam configuration message is received is the first moment, before determining to use the first beam to receive and/or send a signal.

* * * * *